United States Patent
Ahn et al.

(10) Patent No.: US 11,930,398 B2
(45) Date of Patent: *Mar. 12, 2024

(54) WIRELESS COMMUNICATION METHOD FOR TRANSMITTING ACK AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,778

(22) Filed: Aug. 3, 2022

(65) Prior Publication Data

US 2022/0377607 A1 Nov. 24, 2022

Related U.S. Application Data

(63) Continuation of application No. 16/181,319, filed on Nov. 5, 2018, now Pat. No. 11,540,169, which is a
(Continued)

(30) Foreign Application Priority Data

May 11, 2016 (KR) .................. 10-2016-0057759
Jun. 14, 2016 (KR) .................. 10-2016-0074090
Jul. 23, 2016 (KR) .................. 10-2016-0093811

(51) Int. Cl.
*H04L 1/1607* (2023.01)
*H04L 5/00* (2006.01)
(Continued)

(52) U.S. Cl.
CPC .......... *H04W 28/06* (2013.01); *H04L 1/1614* (2013.01); *H04L 1/1621* (2013.01);
(Continued)

(58) Field of Classification Search
None
See application file for complete search history.

(56) References Cited

U.S. PATENT DOCUMENTS

| 9,332,571 B2 | 5/2016 | Zhu et al. |
| 2003/0145095 A1 | 7/2003 | Liu et al. |

(Continued)

FOREIGN PATENT DOCUMENTS

| CA | 2 845 923 | 3/2013 |
| CA | 2 965 807 | 5/2016 |

(Continued)

OTHER PUBLICATIONS

International Search Report for PCT/KR2017/004888 dated Sep. 19, 2017 and its English translation from WIPO (published as WO 2017/196103).

(Continued)

*Primary Examiner* — The Hy Nguyen
(74) *Attorney, Agent, or Firm* — Ladas & Parry, LLP

(57) ABSTRACT

Provided is a wireless communication terminal that communicates wirelessly. The terminal includes: a transceiver; and a processor. The terminal includes a transceiver, and a processor. The processor is configured to receive an Aggregate-MAC Protocol Data Unit (A-MPDU) from an originator using the transceiver, and when receiving all MPDUs included in the A-MPDU, transmit to the originator a block (Continued)

ACK (BA) frame signaling that all MPDUs included in the A-MPDU are received without a bitmap indicating whether each MPDU included in the A-MPDU is received.

5 Claims, 15 Drawing Sheets

Related U.S. Application Data continuation of application No. PCT/KR2017/004888, filed on May 11, 2017.

(51) Int. Cl.
*H04W 28/04* (2009.01)
*H04W 28/06* (2009.01)
*H04W 84/12* (2009.01)
*H04W 88/08* (2009.01)

(52) U.S. Cl.
CPC .......... *H04L 5/0037* (2013.01); *H04L 5/0055* (2013.01); *H04L 5/0091* (2013.01); *H04W 28/04* (2013.01); *H04W 84/12* (2013.01); *H04W 88/08* (2013.01)

(56) References Cited

U.S. PATENT DOCUMENTS

| | | |
|---|---|---|
| 2007/0206508 A1 | 9/2007 | Sammour et al. |
| 2008/0212612 A1 | 9/2008 | Singh et al. |
| 2011/0255618 A1 | 10/2011 | Zhu et al. |
| 2012/0117446 A1 | 5/2012 | Taghavi Nasrabadi et al. |
| 2013/0223345 A1 | 8/2013 | Asterjadhi et al. |
| 2013/0301569 A1 | 11/2013 | Wang et al. |
| 2014/0036775 A1 | 2/2014 | Asterjadhi et al. |
| 2014/0314060 A1 | 10/2014 | Park et al. |
| 2015/0146648 A1 | 5/2015 | Viger et al. |
| 2015/0271002 A1 | 9/2015 | Oh et al. |
| 2015/0288501 A1 | 10/2015 | Kwon et al. |
| 2016/0066338 A1 | 3/2016 | Kwon et al. |
| 2016/0112987 A1 | 4/2016 | Patil et al. |
| 2016/0113009 A1 | 4/2016 | Seok |
| 2016/0113034 A1 | 4/2016 | Seok |
| 2016/0142185 A1 | 5/2016 | Merlin et al. |
| 2016/0227579 A1 | 8/2016 | Stacey et al. |
| 2016/0316458 A1 | 10/2016 | Kwon |
| 2017/0019909 A1 | 1/2017 | Si et al. |
| 2017/0048048 A1* | 2/2017 | Seok ............... H04L 1/1671 |
| 2017/0111951 A1* | 4/2017 | Chu ................. H04L 1/1671 |
| 2017/0230981 A1 | 8/2017 | Ryu et al. |
| 2017/0257887 A1 | 9/2017 | Ghosh et al. |
| 2017/0310446 A1* | 10/2017 | Asterjadhi ........... H04L 1/1685 |
| 2017/0310448 A1 | 10/2017 | Kim et al. |
| 2018/0084605 A1 | 3/2018 | Li et al. |
| 2018/0124858 A1 | 5/2018 | Gan et al. |
| 2018/0167882 A1 | 6/2018 | Choi et al. |
| 2018/0183548 A1 | 6/2018 | Gan et al. |
| 2018/0302924 A1 | 10/2018 | Kim et al. |
| 2018/0332502 A1 | 11/2018 | Chu et al. |
| 2019/0069299 A1 | 2/2019 | Li et al. |
| 2019/0075491 A1 | 3/2019 | Ahn et al. |
| 2019/0182864 A1 | 6/2019 | Huang et al. |
| 2022/0231797 A1* | 7/2022 | Song ................. H04L 1/1861 |

FOREIGN PATENT DOCUMENTS

| | | | |
|---|---|---|---|
| CN | 1586055 A * | 2/2005 | ......... H04L 12/5695 |
| CN | 101006684 | 7/2007 | |
| CN | 102316013 | 1/2012 | |
| CN | 102869094 | 1/2013 | |
| CN | 102948101 | 2/2013 | |
| CN | 104065452 | 9/2014 | |
| CN | 104255068 | 12/2014 | |
| CN | 104321995 | 1/2015 | |
| CN | 104350799 | 2/2015 | |
| CN | 104471891 | 3/2015 | |
| CN | 104871630 | 8/2015 | |
| CN | 105164939 | 12/2015 | |
| CN | 105635986 | 6/2016 | |
| GB | 2520536 | 5/2015 | |
| GB | 201518866 | 12/2015 | |
| IN | 201303057 | 1/2015 | |
| JP | 2006-217242 | 8/2006 | |
| KR | 10-2006-0018403 | 3/2006 | |
| KR | 10-0767314 | 10/2007 | |
| KR | 10-1082232 | 11/2011 | |
| KR | 10-2013-0009959 | 1/2013 | |
| KR | 10-2014-0036295 | 3/2014 | |
| KR | 10-2014-0068750 | 6/2014 | |
| KR | 10-2015-0011345 | 1/2015 | |
| KR | 10-2015-0013465 | 2/2015 | |
| KR | 10-2015-0115662 | 10/2015 | |
| KR | 10-2016-0028354 | 3/2016 | |
| KR | 10-2016-0031954 | 3/2016 | |
| KR | 10-2019-0008537 | 1/2019 | |
| WO | 2014/098367 | 6/2014 | |
| WO | 2015/017555 | 2/2015 | |
| WO | 2015/194727 | 12/2015 | |
| WO | 2015/199306 | 12/2015 | |
| WO | 2016/043538 | 3/2016 | |
| WO | 2016-068572 | 5/2016 | |
| WO | 2017/196103 | 11/2017 | |

OTHER PUBLICATIONS

Written Opinion of the International Searching Authority for PCT/KR2017/004888 dated Sep. 19, 2017 and its English machine translation by Google Translate (published as WO 2017/196103 A1).
Office Action dated Apr. 16, 2020 for U.S. Appl. No. 16/188,274.
Office Action dated Jul. 24, 2020 for Indian Patent Application No. 201827041027.
Notice of Allowance dated Aug. 18, 2020 for U.S. Appl. No. 16/188,274.
Office Action dated Sep. 3, 2020 for Korean Patent Application No. 10-2018-7033463 and its English translation provided by Applicant's foreign counsel.
Khorov et al.: "Considerations on Trigger Frame for Random Access Procedure", doc.: IEEE 802.11-16/0399r1, Mar. 14, 2016. See pp. 1-11.
U.S. Appl. No. 62/237,479: "Multi STA Block ASK Operation", filed on 2015.
Office Action dated Nov. 2, 2020 for Chinese Patent Application No. 201780028603.4 and its English translation provided by Applicant's foreign counsel.
Office Action dated Dec. 18, 2020 for Indian Patent Application No. 201827045395.
International Preliminary Report on Patentability (Chapter I) dated Nov. 13, 2018 for PCT/KR2017/004888 and its English translation from WIPO.
Office Action for Chinese Patent Application No. 201780036770.3 dated Jun. 22, 2021.
Ghosh, Chittabrata et al., "UL OFDMA-based Random Access Procedure", IEEE 802.11-15/1105r0, Intel, Sep. 14, 2015, slides 1-19.
Ghosh, Chittabrata et al., "Signaling of Multi-TID Aggregation Limit", IEEE 802.11-16/0667r0, Intel, May 16, 2016, slides 1-16.
Baron, Stephane et al., "Random RU selection process upon TF-R reception", IEEE 802.11-15/1047r0, Canon, Sep. 30, 2015, slides 1-9.
Office Action dated Aug. 30, 2021 for Korean Patent Application No. 10-2018-7034127 and its English translation provided by Applicant's foreign counsel.
Anwar Saif et al.: "An Optimized A-MSDU Frame Aggregation with Subframe Retransmission in IEEE 802.11n Wireless Networks", International Conference on Computational Science, ICCS 2012 (Dec. 31, 2012).
Office Action dated Nov. 8, 2021 for U.S. Appl. No. 17/100,880.

(56) References Cited

OTHER PUBLICATIONS

Office Action dated Nov. 9, 2021 for U.S. Appl. No. 17/101,755.
Office Action dated Nov. 19, 2021 for Chinese Patent Application No. 201780036198.0 and its English translation provided by Applicant's foreign counsel.
Notice of Allowance dated Dec. 10, 2021 for Korean Patent Application No. 10-2018-7034127 and its English translation provided by Applicant's foreign counsel.
Office Action dated Dec. 13, 2021 for Korean Patent Application No. 10-2018-7031427 and its English translation provided by Applicant's foreign counsel.
Notice of Allowance dated Dec. 13, 2021 for Korean Patent Application No. 10-2021-7017548 and its English translation provided by Applicant's foreign counsel.
Notice of Allowance dated Mar. 25, 2022 for Korean Patent Application No. 10-2022-7006872 and its English translation from Global Dossier.
Notice of Allowance dated Apr. 6, 2022 for U.S. Appl. No. 17/100,880.
Corrected Notice of Allowance dated Apr. 25, 2022 for U.S. Appl. No. 17/100,880.
Notice of Allowance dated Apr. 20, 2022 for Korean Patent Application No. 10-2022-7008125 and its English translation from Global Dossier.
Office Action dated Apr. 29, 2022 for Chinese Patent Application No. 201780036198.0 and its English translation from Global Dossier.
IEEE P802.11ax/D1.0: "High Efficiency (HE) MAC specification", IEEE-SA Piscataway, NJ, USA, Nov. 2016, pp. 1-65.
Notice of Allowance dated May 18, 2022 for U.S. Appl. No. 17/101,755.
Corrected Notice of Allowance dated Jun. 15 and Jun. 2, 2022 for U.S. Appl. No. 17/101,755.
Notice of Allowance dated Jun. 23, 2022 for Korean Patent Application No. 10-2018-7031427 and its English translation provided by Applicant's foreign counsel.
U.S. Appl. No. 62/237,479 "Multi STA Block ACK Operation", 2015.
Cherian et al.: "IEEE P802.11 Wireless LANs, CIDs for Section 9.3.1.9.7 Multi STA BAs", IEEE 802.11-16/0024r1, Apr. 17, 2016, pp. 1-11.
Cherian et al.: "IEEE P802.11, CIDs for Section 25.4/25.4.1, Selection of BlockAck and BlockAckReq variants", IEEE 802.11-16/0024r1, Apr. 17, 2016, pp. 1-11.
Qiao et al.: "BlockAck Bitmap", IEEE 802.11-16/0404r0, Mar. 12, 2016, slides 1-23.
Notice of Allowance dated Jul. 20, 2022 for U.S. Appl. No. 16/181,319 (now published as US 2019/0075491).
Final Office Action dated Apr. 5, 2022 for U.S. Appl. No. 16/181,319 (now published as US 2019/0075491).
Office Action dated Nov. 2, 2021 for U.S. Appl. No. 16/181,319 (now published as US 2019/0075491).
Advisory Action dated Sep. 2, 2021 for U.S. Appl. No. 16/181,319 (now published as US 2019/0075491).
Final Office Action dated May 13, 2021 for U.S. Appl. No. 16/181,319 (now published as US 2019/0075491).
Office Action dated Dec. 10, 2020 for U.S. Appl. No. 16/181,319 (now published as US 2019/0075491).
Advisory Action dated Sep. 11, 2020 for U.S. Appl. No. 16/181,319 (now published as US 2019/0075491).
Final Office Action dated Jun. 9, 2020 for U.S. Appl. No. 16/181,319 (now published as US 2019/0075491).
Office Action dated Feb. 4, 2020 for U.S. Appl. No. 16/181,319 (now published as US 2019/0075491).
Corrected Notice of Allowance dated Aug. 4, 2022 for U.S. Appl. No. 17/101,755.
Office Action dated Aug. 1, 2022 for Chinese Patent Application No. 201780036198.0 and its English translation provided by Applicant's foreign counsel.
Office Action dated Sep. 28, 2022 for Korean Patent Application No. 10-2022-7025209 and its English translation provided by Applicant's foreign counsel.
Office Action dated Feb. 14, 2023 for U.S. Appl. No. 17/873,148.
Office Action dated Mar. 20, 2023 for U.S. Appl. No. 17/879,776.
Notice of Allowance dated Mar. 24, 2023 for Korean Patent Application No. 10-2022-7033149 and its English translation provided by Applicant's foreign counsel.
Notice of Allowance dated Mar. 24, 2023 for Korean Patent Application No. 10-2022-7033150 and its English translation provided by Applicant's foreign counsel.
Office Action dated Jul. 10, 2023 for U.S. Appl. No. 17/879,776.
Notification of Reexamination dated Jul. 27, 2023 for Chinese Patent Application No. 201780036198.0 and its English translation provided by Applicant's foreign counsel.
Office Action dated Aug. 25, 2023 for Korean Patent Application No. 10-2022-7025209 and its English translation provided by Applicant's foreign counsel.
Hearing Notice dated Sept. 5, 2023 for Indian Patent Application No. 201827045395.
Notice of Allowance dated Oct. 31, 2023 for U.S. Appl. No. 17/879,776.
Notice of Allowance dated Nov. 13, 2023 for Chinese Patent Application No. 202110684328.X and its English translation provided by Applicant's foreign counsel.
Notice of Allowance dated Nov. 13, 2023 for Chinese Patent Application No. 202110685618.6 and its English translation provided by Applicant's foreign counsel.
Notice of Allowance dated Nov. 9, 2023 for Chinese Patent Application No. 202110685216.6 and its English translation provided by Applicant's foreign counsel.

* cited by examiner

FIG. 13

(a) ACK

| Frame Control | Duration | RA | QoS Control | FCS |

| Frame Control | Duration | RA | A-Control | FCS |

(b) (M-)BA

| Frame Control | Duration | RA | TA | QoS Control | BA Control | BA Info. | FCS |

| Frame Control | Duration | RA | TA | A-Control | BA Control | BA Info. | FCS |

| Frame Control | Duration | RA | TA | BA Control | BA Info. | QoS Control | FCS |

| Frame Control | Duration | RA | TA | BA Control | BA Info. | A-Control | FCS |

*FIG. 15*

WIRELESS COMMUNICATION METHOD FOR TRANSMITTING ACK AND WIRELESS COMMUNICATION TERMINAL USING SAME

CROSS-REFERENCE TO RELATED APPLICATIONS

This application is a continuation of U.S. patent application Ser. No. 16/181,319 filed on Nov. 5, 2018, which is a continuation of International Patent Application No. PCT/KR2017/004888 filed on May 11, 2017, which claims the priority to Korean Patent Application No. 10-2016-0057759 filed in the Korean Intellectual Property Office on May 11, 2016, Korean Patent Application No. 10-2016-0074090 filed in the Korean Intellectual Property Office on Jun. 14, 2016, and Korean Patent Application No. 10-2016-0093811 filed in the Korean Intellectual Property Office on Jul. 23, 2016, the entire contents of which are incorporated herein by reference.

TECHNICAL FIELD

The present invention relates to a wireless communication method and a wireless communication terminal for transmitting ACK.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An object of an embodiment of the present invention is to provide a wireless communication terminal for transmitting ACK.

Technical Solution

According to the present invention, provided is a wireless communication terminal that is a recipient for receiving data, the terminal including: a transceiver; and a processor. The processor is configured to receive an Aggregate-MAC Protocol Data Unit (A-MPDU) from an originator using the transceiver, and when receiving all MPDUs included in the A-MPDU, transmit to the originator a block ACK (BA) frame signaling that all MPDUs included in the A-MPDU are received without a bitmap indicating whether each MPDU included in the A-MPDU is received.

The processor may be configured to set a predetermined first value in a traffic identifier (TID) field of the BA frame when transmitting the BA frame. The TID field may indicate a TID of an MPDU, in which the MPDU is received by the BA frame.

The predetermined first value may be a value that is not used as a TID value in data transmission.

The processor may be configured to omit a start sequence control field when transmitting the BA frame. The start sequence control field may be for indicating an MPDU, in which whether the MPDU is received indicated by the bitmap.

When transmitting the BA frame, the processor may be configured to set a value of an ACK type field indicating a type of an ACK in the BA frame to a predetermined second value to indicate that the bitmap and the start sequence control field are not included.

The A-MPDU may include a plurality of MPDUs corresponding to a plurality of different TIDs.

When transmitting the BA frame, the processor may be configured to set a value of an ACK type field indicating a type of an ACK in the BA frame to a predetermined value, and may set a TID value agreed on BA frame transmission with the originator in a TID field of the BA frame. The traffic identifier (TID) field may indicate a TID of an MPDU, in which whether the MPDU is received by the BA frame.

When a TID agreed on BA frame transmission with the originator is in plurality, the processor may be configured to set a value of a TID field of the BA frame based on a user priority of a TID.

According to the present invention, provided is a wireless communication terminal that is an originator for transmitting data, the terminal including: a transceiver; and a processor. The processor may be configured to transmit an Aggregate-MAC Protocol Data Unit (A-MPDU) to a recipient using the transceiver, and receive a block ACK (BA) frame from the recipient. The BA frame may indicate that all MPDUs included in the A-MPDU are received without a bitmap indicating whether each MPDU included in the A-MPDU is received.

When a value of a traffic identifier (TID) field of the BA frame is a predetermined first value, the processor may be configured to determine that the BA frame indicates that all MPDUs included in the A-MPDU are received without a bitmap indicating whether each MPDU included in the A-MPDU is received. The TID field may indicate a TID of an MPDU, in which whether the MPDU is received is indicated by the BA frame.

The predetermined first value may be a value that is not used as a TID value in data transmission.

The BA frame may not include a start sequence control field which is for indicating an MPDU, in which whether the MPDU is received indicated by the bitmap.

When a value of the TID field of the BA frame is a predetermined first value and a value of an ACK type field of the BA frame is a predetermined second value, the processor may be configured to determine that the BA frame indicates that all MPDUs included in the A-MPDU are received without a bitmap indicating whether each MPDU included in the A-MPDU is received. The ACK type field may indicate a type of an ACK.

The A-MPDU may include a plurality of MPDUs corresponding to a plurality of different TIDs.

According to the present invention, provided is an operation method of a wireless communication terminal that is a recipient for receiving data, the method including: receiving an Aggregate-MAC Protocol Data Unit (A-MPDU) from an originator; and when receiving all MPDUs included in the A-MPDU, transmitting to the originator a block ACK (BA) frame signaling that all MPDUs included in the A-MPDU are received without a bitmap indicating whether each MPDU included in the A-MPDU is received.

The transmitting the BA frame may include configuring a predetermined first value in a traffic identifier (TID) field of the BA frame when transmitting the BA frame. The TID field may indicate a TID of an MPDU, in which whether the MPDU is received is indicated by the BA frame.

The predetermined first value may be a value that is not used as a TID value in data transmission.

The transmitting the BA frame may further include omitting a start sequence control field when transmitting the BA frame. The start sequence control field may be for indicating an MPDU, in which whether the MPDU is received indicated by the bitmap.

The omitting the start sequence control field may include, when transmitting the BA frame, setting a value of an ACK type field indicating a type of an ACK in the BA frame to a predetermined second value to indicate that the bitmap and the start sequence control field are not included.

The A-MPDU may include a plurality of MPDUs corresponding to a plurality of different TIDs.

Advantageous Effects

An embodiment of the present invention provides a wireless communication method for transmitting ACK and wireless communication terminal using the same.

DESCRIPTION OF DRAWINGS

FIG. 13 shows a method of transmitting an M-BA frame by a wireless communication terminal according to another embodiment of the present invention.

FIG. 15 shows an operation in which a wireless communication terminal transmits a BSR according to another embodiment of the present invention.

MODE FOR CARRYING OUT THE INVENTION

Figure 1:
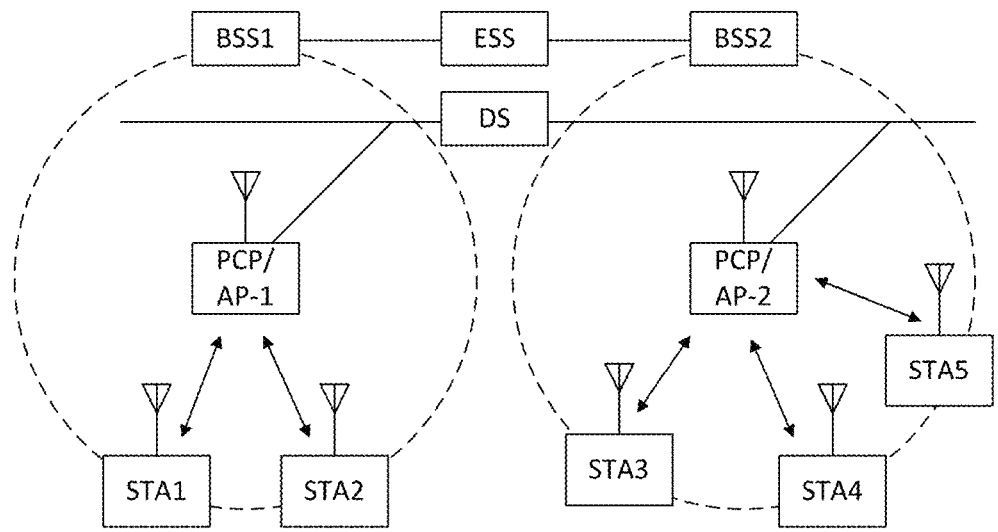
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0057759 (2016.05.11), Nos. 10-2016-0074090 (2016.06.14), and Nos. 10-2016-0093811 (2016.07.23) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
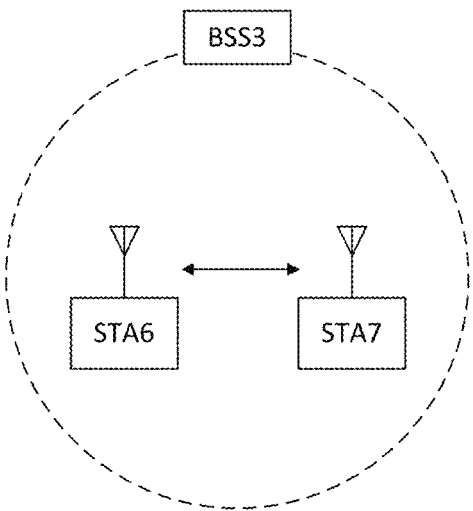
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
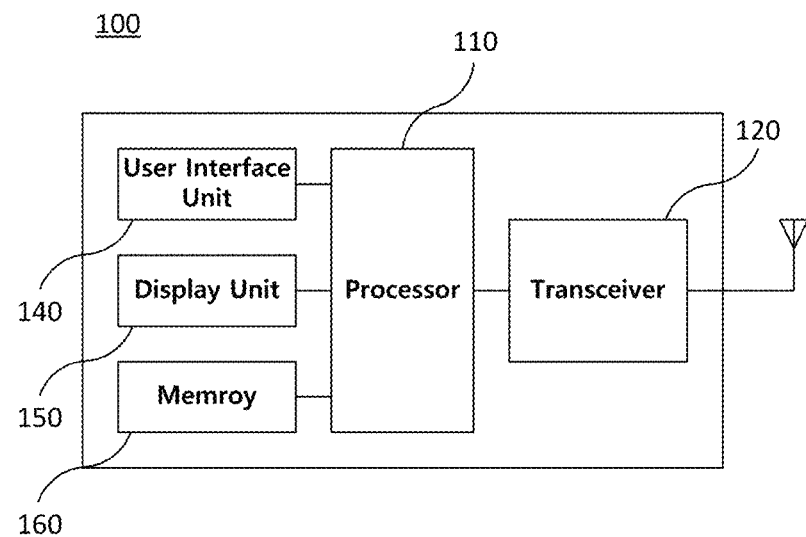
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
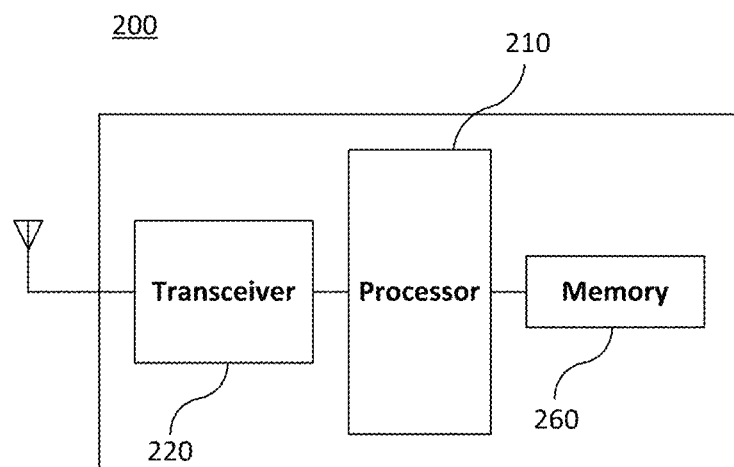
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
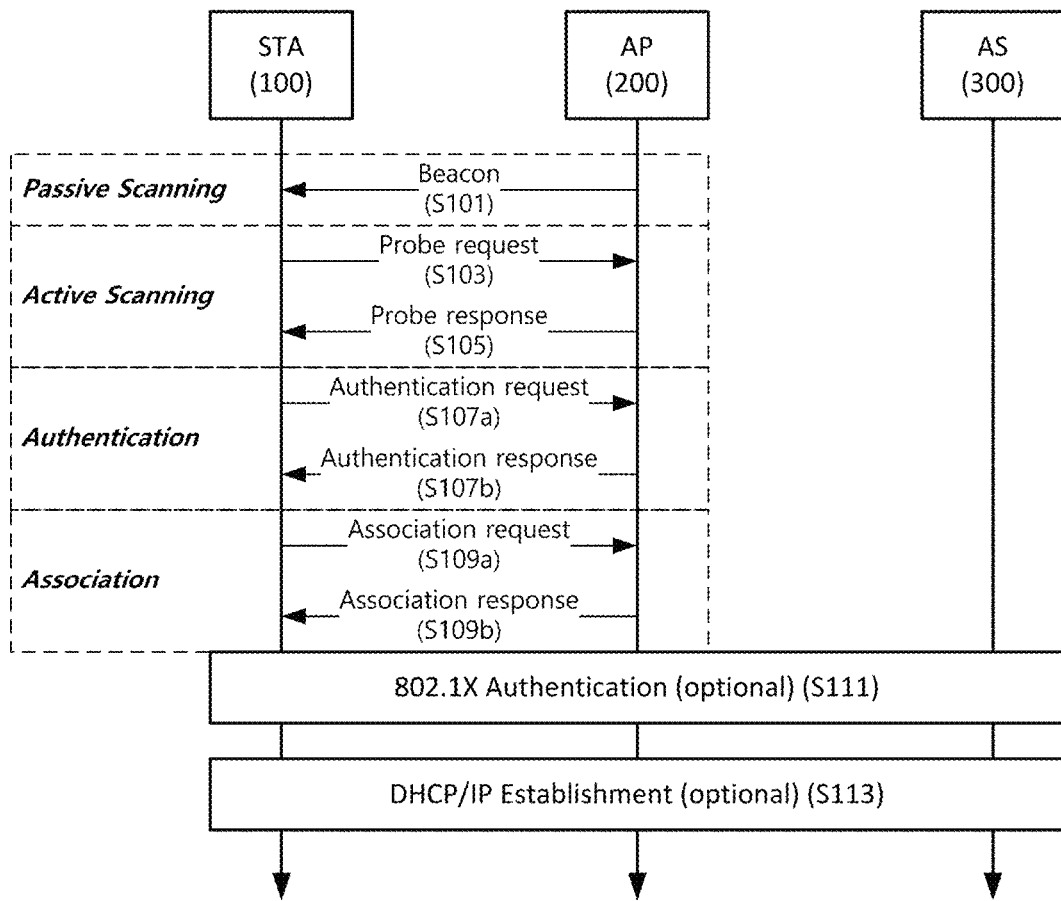
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

Figure 6:
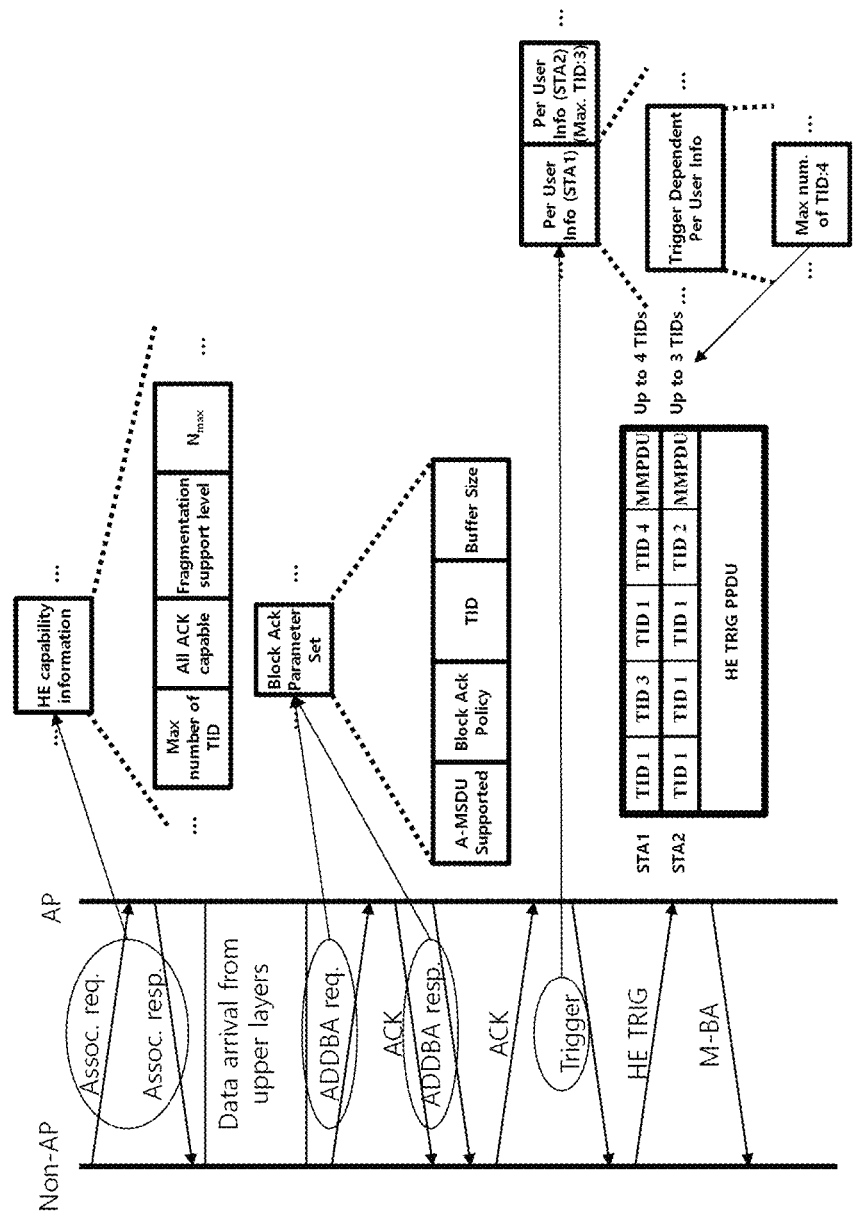
FIG. 6 shows a method for transmitting a Block ACK (BA) frame for an Aggregate-MAC Protocol Data Unit (A-MPDU) according to an embodiment of the present invention.

FIG. 6 shows a method for transmitting a Block ACK (BA) frame for an Aggregate-MAC Protocol Data Unit (A-MPDU) according to an embodiment of the present invention.

The wireless communication terminal may aggregate a plurality of MPDUs to generate one A-MPDU. The wireless communication terminal may transmit the generated A-MPDU. The legacy wireless communication terminal aggregates only the MPDUs having the same traffic identifier (TID) to generate the A-MPDU. The wireless communication terminal according to the embodiment of the present invention may aggregate a plurality of MPDUs having different TIDs to generate one A-MPDU. For convenience of explanation, an A-MPDU including a plurality of MPDUs corresponding to a plurality of different TIDs is referred to as a Multi-TID A-MPDU or an A-MPDU with Multiple TIDs. The wireless communication terminal may transmit the A-MPDU more flexibly through it. Specifically, a wireless communication terminal may transmit an A-MPDU with multiple TIDs using a Physical Layer Protocol Data Unit (HE PPDU). In this case, the HE PPDU may be an HE Multi User (MU) PPDU. Also, the HE PPDU may be an HE trigger-based PPDU.

The wireless communication terminal may set parameters related to A-MPDU and BA frame transmission in a link setup procedure. The wireless communication terminal may set parameters related to transmission of an A-MPDU with multiple TIDs in the link setup procedure. Specifically, the wireless communication terminal may transmit the maximum TID number information indicating the maximum number of TIDs that the wireless communication terminal may simultaneously receive in the link setup procedure. In this case, the wireless communication terminal may transmit the maximum TID number information using the HE capability information element indicating the capability of the terminal. This is because as the number of TIDs of an A-MPDU with Multiple TIDs increases, the high processing capability of the wireless communication terminal receiving the A-MPDU may be required. The maximum TID number information may be the maximum number of TID fields of the HE capability information element. The maximum TID number information transmitted by the AP to the non-AP wireless communication terminal may indicate the maximum TID number that the MPDU included in the UpLink (UL) A-MPDU transmitted by the corresponding non-AP wireless communication terminal may have. In addition, the maximum TID number information transmitted by the non-AP wireless communication terminal to the AP may indicate the maximum TID number that the DownLink (DL) A-MPDU transmitted by the corresponding AP may have. In the link setup procedure, the wireless communication terminal may transmit the maximum TID number information using the management frame. In this case, the management frame may be at least one of a probe request frame, a probe response frame, an authentication request frame, an authentication response frame, an association request frame, an association response frame, and a beacon frame. Also, when the AP transmits the maximum TID number information using the beacon frame, the maximum TID number information may indicate the TID number that the AP may simultaneously receive. Specifically, when an AP transmits a maximum TID number information using a beacon frame, the maximum TID number information may indicate the maximum TID number that is allowed to be transmitted in the MU UL transmission, not the maximum TID number that the MPDU included in the A-MPDU transmitted from any one wireless communication terminal to the AP may have. This is because the AP transmits the beacon frame to the entire wireless communication terminal of the BSS operated by the AP. In another specific embodiment, the maximum TID number information of the beacon frame may be used for other purposes. In another specific embodiment, the maximum number of TID field of the beacon frame may be a reserved field.

In the link setup procedure, the wireless communication terminal may transmit an All ACK capable indicator indicating whether the wireless communication terminal may process All ACKs. In this case, the All ACK indicates that the wireless communication terminal signals that all the MPDUs included in the A-MPDU received from the originator are received. Specifically, the wireless communication terminal may transmit an All ACK capable indicator indicating whether the All ACK may be processed using the HE capability information element.

The wireless communication terminal may fragment and transmit at least one of a MAC service data unit (MSDU), an Aggregate (A)-MSDU, and a management protocol data unit (MMPDU). For convenience of explanation, a portion of an MSDU, a portion of an A-MSDU, or a portion of an MMPDU, which are generated through fragmentation, is referred to as a fragment. In addition, a wireless communication terminal that transmits data is referred to as an originator, and a wireless communication terminal that receives data is referred to as a recipient.

Specifically, the wireless communication terminal may generate a plurality of fragments by fragmenting at least one of an MSDU, an A-MSDU, and an MMPDU. In this case, the wireless communication terminal may transmit the generated plurality of fragments to a plurality of MPDUs. In addition, the wireless communication terminal receiving a plurality of fragments may defragment a plurality of fragments to obtain at least one of one MSDU, one A-MSDU, and one MMPDU. In this case, the MPDU may be an S-MPDU or an A-MPDU.

The recipient needs sufficient buffer capacity and processing capacity to defragment multiple fragments. Specifically, the recipient is required to store all fragments until the recipient receives all the fragments of the MSDU corresponding to the same sequence number. Thus, when the recipient supports the capability to receive fragments, the originator may transmit the fragments to the recipient. Eventually, the originator is required to know the fragmentation level that the recipient supports. In this case, the fragmentation level indicates the fragmentation degree that the wireless communication terminal may receive. The wireless communication terminal may signal for the fragmentation level. Specifically, the wireless communication terminal transmits information on the fragmentation level of the fragments that the wireless communication terminal may receive in the link setup procedure with the AP, and receives information on the fragmentation level of the fragments that the AP may receive. Specifically, the wireless communication terminal may transmit information on the fragmentation level using the HE Capability information element. In this case, the HE Capability information element may indicate the capability of the wireless communication terminal. Further, the wireless communication terminal may transmit information on the fragmentation level through at least one of a probe request frame, a probe response frame, an authentication request frame, an authentication response frame, an association request frame, and an association response frame.

In addition, the fragmentation level may be divided into four levels. Level 0 may indicate that the wireless communication terminal does not support fragmentation for the MSDU the wireless communication terminal receives. Also, level 1 may indicate that the wireless communication terminal may be capable of receiving an MPDU that includes one fragment. In this case, the MPDU may be a single MPDU that is not aggregated with another MPDU, or an MPDU that is not an A-MPDU. Also, level 2 may indicate that the wireless communication terminal may receive an A-MPDU that includes one fragment per MSDU. Specifically, level 2 may indicate that the wireless communication terminal may be capable of receiving an A-MPDU that includes one or fewer fragments per MSDU. Level 3 may indicate that the wireless communication terminal may receive an A-MPDU including a plurality of fragments per MSDU. Specifically, level 3 may indicate that the wireless communication terminal may be capable of receiving an A-MPDU including four or fewer fragments per MSDU.

As described above, the HE capability information element may include a Max number of TID field, an All ACK capable indicator, and information (Fragmentation support level) indicating a fragmentation level supported by the wireless communication terminal. The specific format of the HE capability information element may be the same as that of the embodiment of FIG. 6.

Further, the wireless communication terminal may set BA parameters in the Add Block ACK (ADDBA) procedure. In this case, the BA parameter is a parameter used for BA frame transmit and BA frame reception. The wireless communication terminal may request an ACK in the form of a BA frame using an ADDBA request frame. Also, the wireless communication terminal may transmit a response to the ADDBA request frame using the ADDBA response frame. The ADDBA request frame and the ADDBA response frame may include a Block Ack Parameter Set element. In this case, the Block Ack Parameter Set element includes information on the BA parameter. In addition, the wireless communication terminal may set BA parameters for each TID. Specifically, the wireless communication terminal may negotiate the BA parameter set-up for each TID. In a specific embodiment, the wireless communication terminal may specify a TID that is the subject of the BA parameter set-up negotiation using the TID field included in the Block Ack Parameter Set element. The originator may request the BA parameter configuration by transmitting an ADDBA request frame. The recipient may receive the ADDBA request frame and transmit the ADDBA response frame for the ADDBA request frame to determine the BA parameter set-up. If the originator receives an ADDBA response frame and transmits an ACK frame for the ADDBA response frame, the originator and recipient may set the BA parameters.

The wireless communication terminal may transmit buffer size information indicating the number of MPDUs that may be stored until transmitting the BA frame after receiving the data in the ADDBA procedure. Specifically, the wireless communication terminal may transmit the buffer size information using the Block Ack Parameter Set element in the ADDBA procedure. The wireless communication terminal may set the length of the BA bitmap based on a range of values that the buffer size information may have. Specifically, when the range of the value that the buffer size information may have is between 1 and X, the wireless communication terminal may set the length of the BA bitmap to X bits. In this case, when the wireless communication terminal fails to receive information on the length of the BA bitmap, the wireless communication terminal may set the length of the BA bitmap to X bits. The specific format of the Block Ack Parameter Set element may be the same as that of the embodiment of FIG. 6.

When the AP performs DL transmission to the wireless communication terminal, the AP may transmit the A-MPDU based on the capability of the wireless communication terminal signaled in the link setup procedure and the BA parameter set in the ADDBA procedure. In this case, the wireless communication terminal may transmit a BA frame or a Multi-STA Block ACK (M-BA) frame to the AP based on the capability of the AP and the BA parameter set in the ADDBA procedure. A specific format of the BA frame will be described with reference to FIG. 8.

When the AP simultaneously receives A-MPDUs from a plurality of wireless communication terminals, the AP may be difficult to store a plurality of MPDUs received by the AP in a buffer and maintain a score board. In this case, the score board indicates information on the reception status of each of the MPDUs recorded by the AP. Therefore, the AP may use the trigger frame to indicate the maximum TID number that the A-MPDU to be transmitted by each wireless communication terminal is capable of having. Specifically, the AP may use the Per User Info field of the trigger frame to indicate the maximum TID to be transmitted by each wireless communication terminal. In this case, the wireless communication terminal receiving the trigger frame may set the number of TIDs that the A-MPDU is capable of having based on the trigger frame. Specifically, the wireless communication terminal receiving the trigger frame may configure the TID number of the MPDU included in the A-MPDU to transmit based on the maximum TID number indicated by the trigger frame, and transmit the A-MPDU to the AP. For example, the wireless communication terminal receiving the trigger frame may set the TID number of the MPDU included in the A-MPDU to transmit so as not to exceed the maximum TID number indicated by the trigger frame, and transmit the A-MPDU to the AP.

In addition, when the wireless communication terminal uses the HE MU PPDU in the Single User (SU) Uplink (UL) transmission, the wireless communication terminal may be not allowed that the wireless communication terminal transmits the A-MPDU with multiple TIDs. The wireless communication terminal may use a relatively wide transmission range in a narrow frequency band using the HE MU PPDU in SU UL transmission. In this case, if the wireless communication terminal is allowed to transmit the A-MPDU including the A-MPDU with multiple TIDs, an equity problem may occur in terms of competition with other wireless communication terminals. Therefore, when the wireless communication terminal uses the HE MU PPDU in the SU UL transmission, it may be not allowed that the wireless communication terminal transmits the A-MPDU with multiple TIDs.

Figure 7:
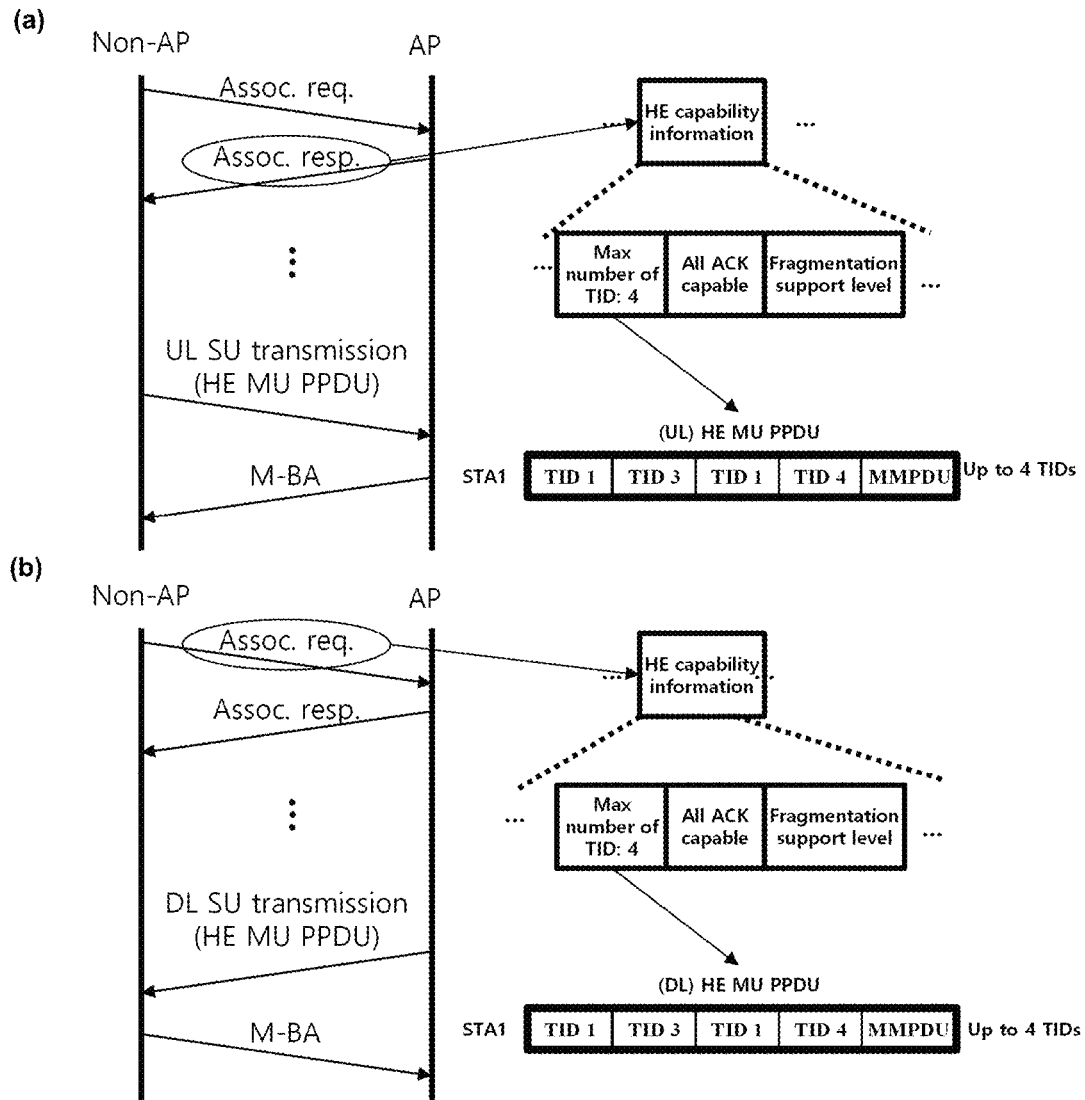
FIG. 7 shows that a wireless communication terminal transmits an A-MPDU with multiple TIDs according to an embodiment of the present invention.

FIG. 7 shows that a wireless communication terminal transmits an A-MPDU with multiple TIDs according to an embodiment of the present invention.

When a wireless communication terminal transmits an HE trigger-based PPDU or transmits an HE MU PPDU in a DL MU transmission, the wireless communication terminal may transmit a Multi-TID A-MPDU. Also, the wireless communication terminal may transmit a Multi-TID A-MPDU according to a certain condition even in SU transmission. Specifically, the wireless communication terminal may transmit the Multi-TID A-MPDU using the HE MU PPDU. Also, the wireless communication terminal may set the number of TIDs of the Multi-TID A-MPDU based on the maximum TID number information described above. Specifically, the wireless communication terminal may set the number of TIDs of the Multi-TID A-MPDU up to the maximum TID number indicated by the maximum TID number information. In the UL transmission, the wireless communication terminal may obtain the maximum TID number information from the association response frame or the authentication response frame. Also, in the DL transmission, the wireless communication terminal may obtain the maximum TID number information from the association request frame or the authentication request frame.

In the embodiment of FIG. 7(a), the non-AP wireless communication terminal transmits a multi-TID A-MPDU to the AP in the UL SU transmission. In this case, the non-AP wireless communication terminal obtains the HE Capability information element from the association response (Assoc. Resp.) frame. Also, the non-AP wireless communication terminal obtains the maximum TID number information from the Max number of TID field of the HE Capability information element. In this case, the maximum TID number information is 4. Therefore, the non-AP wireless communication terminal transmits the multi-TID A-MPDU having the TID number of 4 (TID 1, TID 3, TID 4, MMPDU) to the AP.

In the embodiment of FIG. 7(b), the AP transmits a multi-TID A-MPDU to the non-AP wireless communication terminal in the DL SU transmission. In this case, the AP obtains the HE Capability information element from the association request (Assoc. Req.) Frame. Also, the AP obtains the maximum TID number 4 from the Max number of TID field of the HE Capability information element. Therefore, the AP transmits the multi-TID A-MPDU having the TID number of 4 (TID 1, TID 3, TID 4, MMPDU) to the non-AP wireless communication terminal.

Figure 8:
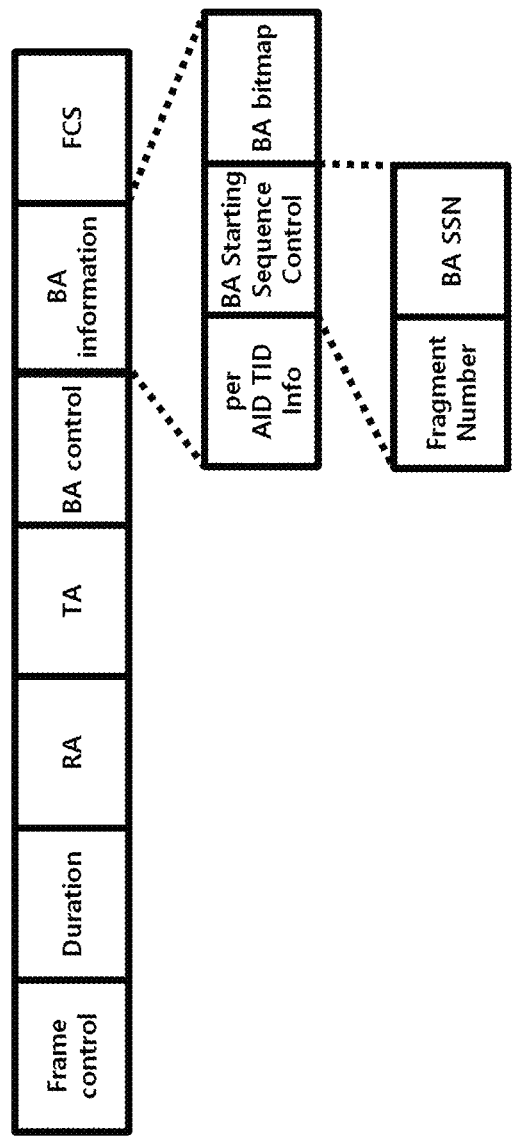
FIG. 8 shows a format of a Multi-STA Block ACK frame according to an embodiment of the present invention.

FIG. 8 shows a format of a Multi-STA Block ACK frame according to an embodiment of the present invention.

The wireless communication terminal may transmit a Block Ack (BA) frame indicating whether a plurality of MPDUs are received. Also, the wireless communication terminal may transmit a Multi-STA Block ACK (M-BA) frame indicating whether a multi-TID A-MPDU (multi-STA multi-TID A-MPDU, single-STA multi-TID A-MPDU) is received or whether an MPDU (multi-STA single TID) corresponding to one TID is received from each of the plurality of wireless communication terminals. The M-BA frame may include a Per AID TID Info subfield indicating whether the reception per AID and the TID is performed.

Specifically, the M-BA frame may include a BA control field. In this case, the BA control field may include information on the type and function of the BA. In addition, the M-BA frame may include a BA Information field. The BA Information field may indicate an MPDU indicating whether the BA is received. Also, the BA Information field may indicate whether data is received. Specifically, the BA Information field may include a bitmap indicating whether each of the MPDUs or the sequence is received. In this case, the bitmap may be a Block ACK Bitmap field.

The Block ACK Bitmap field is a bitmap indicating whether data is received. A legacy wireless communication terminal may transmit one MSDU in up to 16 fragments. Therefore, the legacy wireless communication terminal may indicate whether the fragments included in each of 64 MSDUs are received by using the Block ACK Bitmap field having a length of 128 bytes. Specifically, the legacy wireless communication terminal allocates 1024 bits of the Block ACK Bitmap field to each fragment included in the MSDU, and sets a bit corresponding to the received fragment to 1. The legacy wireless communication terminal may indicate whether all fragments are received through the block ACK Bitmap field. Therefore, the legacy wireless communication terminal may set the Fragment Number field of the Block ACK Starting Sequence Control field to the reserved field and may use only the Sequence Number field.

The wireless communication terminal according to the embodiment of the present invention may fragment one MSDU into up to four fragments as described above. In addition, the number of fragments that the wireless communication terminal may generate by fragmenting the MSDU varies depending on the fragmentation level. Therefore, the wireless communication terminal may change the indication method of the Block ACK Bitmap field according to the fragmentation level. Specifically, when the level of fragmentation applied to the data received by the wireless communication terminal is lower than level 3, the wireless communication terminal may set each bit of the Block ACK Bitmap field to indicate whether the MSDU is received. In addition, when the fragmentation level applied to the data received by the wireless communication terminal is level 3, the wireless communication terminal may set each bit of the Block ACK Bitmap field to indicate whether each of the fragments is received.

The BA Information field may include a Block ACK Starting Sequence Control subfield that indicates data indicating whether the Block ACK Bitmap field is received. Specifically, the Block ACK Starting Sequence Control subfield may indicate the start number of the data indicated by the Block ACK Bitmap field. The wireless communication terminal may indicate whether the bits of the Block ACK Bitmap field are divided into a sequence unit or a fragment unit through a Block ACK Starting Sequence Control subfield. Specifically, the wireless communication terminal may set the Least Significant Bit (LSB) of the Fragment Number subfield of the Block ACK Starting Sequence Control subfield to 0 to indicate that the bits of the Block ACK Bitmap field are divided in sequence units. In addition, the wireless communication terminal may set the LSB of the Fragment Number subfield of the Block ACK Starting Sequence Control subfield to 1 to indicate that the bits of the Block ACK Bitmap field are divided in fragment units. Also, the wireless communication terminal may indicate the length of the Block ACK Bitmap field through the Block ACK Starting Sequence Control subfield. Specifically, the wireless communication terminal may set the values of two bits (LSB+1, LSB+2) following the LSB of the Fragment Number subfield of the Block ACK Starting Sequence Control subfield to indicate the length of the Block ACK Bitmap field. In this case, the number of BA information fields included in the M-BA frame may be changed according to the number of wireless communication terminals transmitting data and the TID number. Specifically, the M-BA frame may include a BA Information field repeatedly by a TID number transmitted by a plurality of wireless communication terminals.

As described above, the wireless communication terminal may signal the fragmentation level supported by the wireless communication terminal in the link setup procedure. Also, the wireless communication terminal may negotiate the fragmentation level in the ADDBA procedure. In this case, when the recipient supporting the fragmentation level: level 3 does not receive any MPDU included in the A-MPDU, it is difficult for the recipient to determine in which fragmentation level the originator transmits the A-MPDU. Therefore, a recipient supporting a fragmentation level: level 3 may transmit an M-BA frame including a BA bitmap field, which is divided into fragments, irrespective of the configuration of the received A-MPDU.

Figure 9:
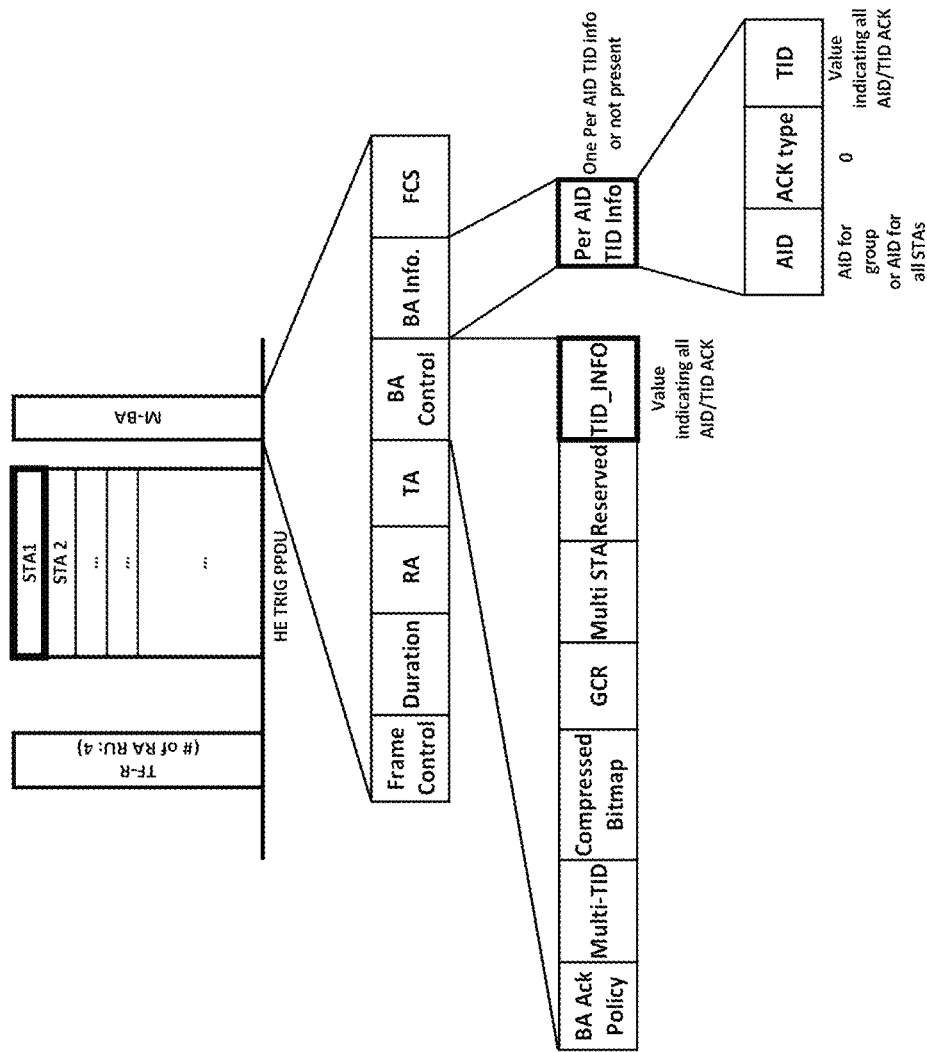
FIG. 9 shows a method of transmitting an M-BA frame by a wireless communication terminal according to an embodiment of the present invention.

FIG. 9 shows a method of transmitting an M-BA frame by a wireless communication terminal according to an embodiment of the present invention.

As described above, the wireless communication terminal may change the bitmap format indicating whether data is received according to the format of the received data. When the wireless communication terminal receives all the MPDUs included in the A-MPDU, the wireless communication terminal may omit a bitmap indicating whether data is received in the M-BA frame. In addition, when the wireless communication terminal receives only one MPDU corresponding to one TID, the wireless communication terminal may omit a bitmap indicating whether data is received in the M-BA frame. In addition, when the AP receives all the MPDUs transmitted by the plurality of wireless communication terminals, the wireless communication terminal may omit the bitmap indicating whether data is received in the M-BA frame. This is because when the wireless communication terminal receives all the MPDUs included in the A-MPDU or only one single MPDU corresponding to one of the TIDs, the wireless communication terminal may indicate whether the data is received even if the bitmap is not used.

Specifically, the wireless communication terminal may set the TID Info subfield to a predetermined value to indicate that the AP receives all the MPDUs transmitted by the plurality of wireless communication terminals. The predetermined value may be 15 ($1111_{2b}$). In this case, the AP may insert one per AID TID Info subfield in the BA Info field. Specifically, the per AID TID Info subfield may include an AID field indicating a wireless communication terminal corresponding to the Per TID Info subfield. In addition, the per AID TID Info subfield may include an ACK type field indicating the type of ACK. In addition, the per AID TID Info subfield may include a TID field indicating the TID of the MPDU corresponding to the per AID TID Info subfield. When the AP receives all the MPDUs transmitted by the plurality of wireless communication terminals, the AP may set the AID field of the per AID TID Info subfield to an AID indicating a plurality of wireless communication terminals transmitting data. Also, the AP may insert one per AID TID Info subfield and set the AID field of the per AID TID Info subfield to an AID indicating the entire wireless communication terminal. Also, the AP may configure the ACK type of the AID TID Info subfield to indicate that the bitmap is omitted. Specifically, the AP may set the ACK type field of the AID TID Info sub field to a predetermined value to indicate that the BA Starting Sequence Control field and the BA bitmap field are omitted in the BA Information field. In this case, the predetermined value may be 0. In yet another specific embodiment, the AP may omit the per AID TID Info subfield.

In such embodiments, when the TID Info subfield of the M-BA frame received by the wireless communication terminal is a predetermined value, the wireless communication terminal may determine that the AP receives all the data transmitted from the plurality of wireless communication terminals.

In addition, the wireless communication terminal may set one of the reserved bits of the BA control field to a predetermined value to indicate that the AP receives all the MPDUs transmitted by the plurality of wireless communication terminals. If one of the reserved bits in the BA control field of the M-BA frame received by the wireless communication terminal is a predetermined value, the wireless communication terminal may determine that the AP receives all the data transmitted from the plurality of wireless communication terminals.

Through FIGS. 10 to 13, when the wireless communication terminal receives all the MPDUs included in the A-MPDU transmitted by any one of the wireless communication terminals, a method of transmitting an M-BA frame by a wireless communication terminal will be described.

Figure 10:
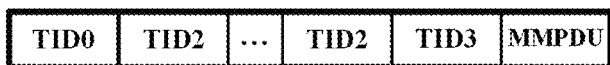
FIG. 10 shows a method of transmitting an M-BA frame by a wireless communication terminal according to an embodiment of the present invention.
Figure 10:
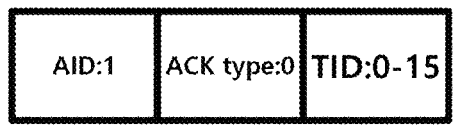
Figure 10:
Figure 10:
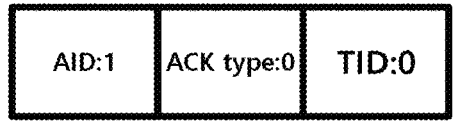

FIG. 10 shows a method of transmitting an M-BA frame by a wireless communication terminal according to an embodiment of the present invention.

When the wireless communication terminal receives all the MPDUs included in the A-MPDU, the wireless communication terminal may set the ACK type field of the Per AID TID Info subfield to a predetermined value. Specifically, the wireless communication terminal may set the ACK type field of the AID TID Info sub field to a predetermined value to indicate that the BA Starting Sequence Control field and the BA bitmap field are omitted in the BA Information field. In this case, the predetermined value may be 0. In yet another specific embodiment, the predetermined value may be 1. In this case, the wireless communication terminal may set the TID field of the Per AID TID Info subfield to one of the TIDs of the MPDUs receiving the TID field. When the ACK type field value of the Per AID TID Info sub-field of the M-BA frame received by the wireless communication terminal is a predetermined value, the wireless communication terminal may determine that the wireless communication terminal transmitting the M-BA frame receives all the MPDUs included in the A-MPDU.

As described above, the wireless communication terminal may transmit the Multi-TID A-MPDU. Also, when the wireless communication terminal receives not only all the MPDUs included in the A-MPDU but also one single MPDU corresponding to any one TID, the wireless communication terminal may omit the BA Starting Sequence Control field and the BA bitmap field in the BA Information field. However, if the A-MPDU includes an MPDU corresponding to a TID with an agreement on BA frame transmission and fails to receive even one MPDU in the A-MPDU, the wireless communication terminal may not omit the BA bitmap field in the BA Information field.

If the ACK type field of the Per AID TID Info sub-field of the M-BA received by the originator is a predetermined value, it is difficult for the originator to determine whether the recipient receives all the MPDUs included in the A-MPDU or receives a single MPDU corresponding to any one TID. In the embodiment of FIG. 10(a), the recipient receives all MPDUs and MMPDUs included in the A-MDPU transmitted by originator (AID: 1). In this case, the recipient sets the AID field of the Per User Info field to 1, sets the ACK type field to 0, and sets the TID field to an arbitrary value. Also, in the embodiment of FIG. 10 (*b*), the recipient receives only the MPDUs whose TID is 0 among the MPDUs included in the A-MPDU transmitted by the originator (AID: 1). In this case, the recipient sets the AID field of the Per User Info field to 1, sets the ACK type field to 0, and sets the TID field to 0. In the embodiment of FIG. 10(*a*), when the recipient sets the TID field of the Per User Info field to 0, the format of the M-BA frame when the recipient receives all the MPDUs included in the A-MPDU transmitted by the originator and the format of the M-BA frame when the recipient receives only the MPDU with the TID value corresponding to 0 are the same.

Therefore, if the wireless communication terminal does not receive any MPDU included in the A-MPDU, the wireless communication terminal may transmit a BA Information field including a BA Starting Sequence Control field and a BA bitmap field regardless of an agreement on the BA frame transmission. The wireless communication terminal may prevent confusion between the case of receiving only one MPDU corresponding to one TID and the case of receiving all the MPDUs included in the A-MPDU through this embodiment. In this embodiment, even when the wireless communication terminal receives an MPDU corresponding to one TID, the wireless communication terminal transmits a bitmap indicating whether data is received. Therefore, the M-BA frame transmission efficiency of the wireless communication terminal may be lowered. Therefore, the wireless communication terminal may set the agreed TID for the BA frame transmission to the TID field value of the Per AID TID Info subfield. This will be described in more detail with reference to FIG. 11.

Figure 11:
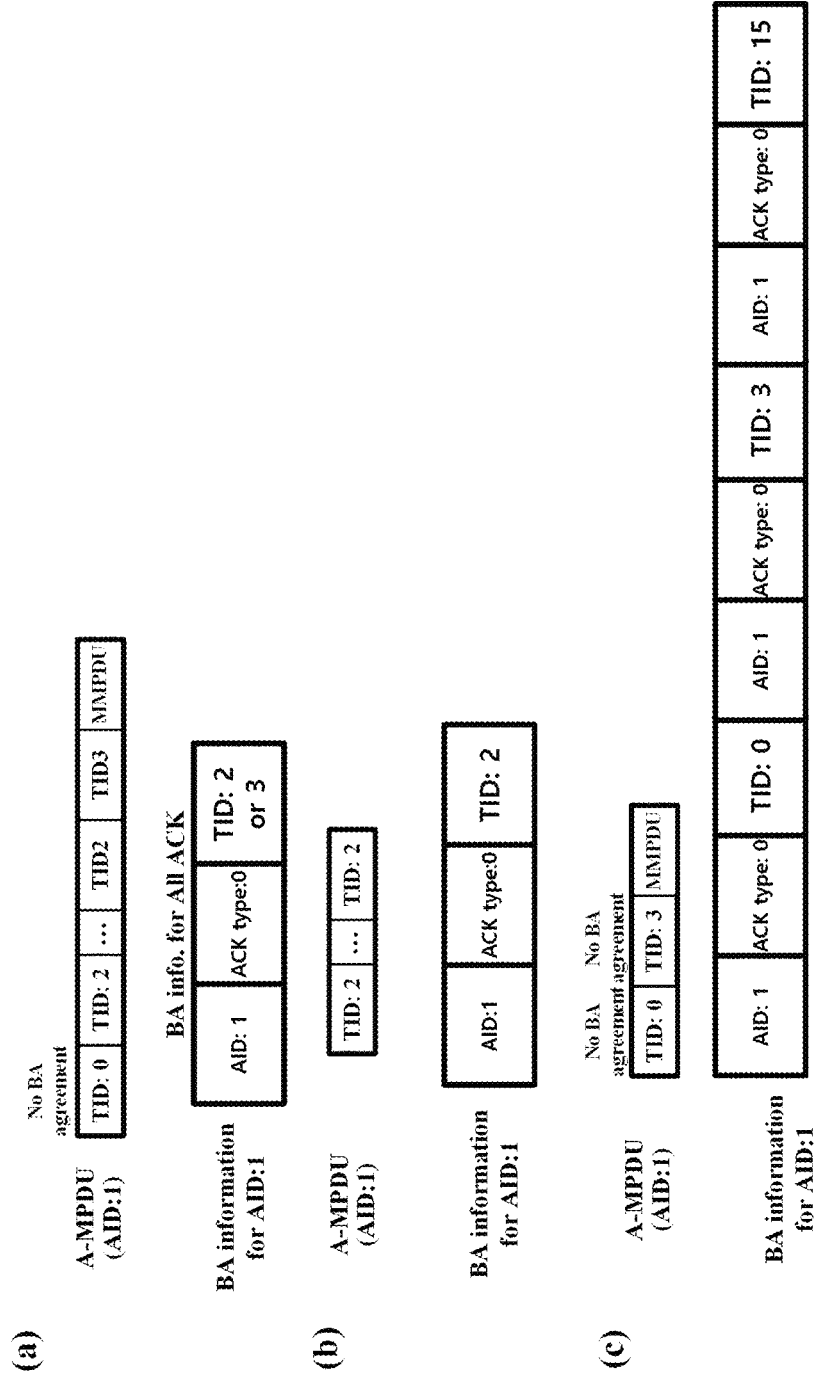
FIG. 11 shows a method of transmitting an M-BA frame by a wireless communication terminal according to another embodiment of the present invention.

FIG. 11 shows a method of transmitting an M-BA frame by a wireless communication terminal according to another embodiment of the present invention.

When the wireless communication terminal receives all the MPDUs included in the A-MPDU, the wireless communication terminal may set the ACK type field of the Per AID TID Info subfield to a predetermined value and set the agreed TID for BA frame transmission to the TID field value of the Per AID TID Info subfield. If a TID agreed on the BA frame transmission is provided in plurality, the wireless communication terminal may set the TID corresponding to the last transmitted MPDU among the plurality of MPDUs corresponding to the agreed TID for the BA frame transmission to the TID field value of the Per AID TID Info subfield. In another specific embodiment, when a TID agreed on the BA frame transmission is provided in plurality, the wireless communication terminal may set the TID field value of the Per AID TID Info subfield based on the user priority (UP) of the TID. Specifically, the wireless communication terminal may set the TID having the highest UP to the TID field value of the Per AID TID Info subfield. In another specific embodiment, the wireless communication terminal may set the TID having the lowest UP value to the TID field value of the Per AID TID Info subfield. In this embodiment, when there is no TID agreed on the BA frame transmission, even if the wireless communication terminal receives all the MPDUs included in the A-MPDU, the wireless communication terminal must transmit a bitmap indicating whether data is received.

In the embodiment of FIG. 11(*a*), the recipient receives the A-MDPU from the originator with an AID value of 1 and decodes all MPDUs included in the A-MPDU. In this case, the A-MPDU includes MPDU and MMPDU corresponding to TID values 0, 2, and 3, respectively. There is an agreement on the BA frame transmission for the TID values 2 and 3 between the originator and the recipient, and there is no agreement on the BA frame transmission for the TID value 1. Therefore, the originator sets the AID field value of the Per AID TID Info subfield to 1, sets the ACK type field to the predetermined value, and sets the TID field value to 2 or 3 to indicate that all the MPDUs included in the A-MPDU transmitted by the originator are received. In this case, the predetermined value indicates that the BA Starting Sequence Control field and the BA bitmap field are omitted in the BA Information field as described above. The predetermined value may be 0. In the embodiment of FIG. 11(*b*), the recipient receives the A-MDPU from the originator with an AID value of 1 and decodes all MPDUs included in the A-MPDU. In this case, the A-MPDU includes only the MPDU corresponding to the TID value of 2. The originator and the recipient agree on the BA frame transmission for the TID value 2. Therefore, the originator sets the AID field value of the Per AID TID Info subfield to 1, sets the ACK type field to the predetermined value, and sets the TID field value to 2 to indicate that all the MPDUs included in the A-MPDU transmitted by the originator are received. In the embodiment of FIG. 11(*c*), the recipient receives the A-MDPU from the originator with an AID value of 1 and decodes all MPDUs included in the A-MPDU. In this case, the A-MPDU includes MPDU and MMPDU corresponding to TID values 0 and 3, respectively. For the TID values 0 and 3, there is no agreement on the BA frame transmission between the recipient and the originator. Therefore, the recipient transmits the per AID TID Info subfield for TID value 0, the per AID TID Info subfield for TID value 3, and the per AID TID Info subfield for MMPDU. In this case, the originator sets the TID field value of the per AID TID Info subfield for MMPDU to predetermined 15 for the MMPDU. In addition, the recipient omits the BA Starting Sequence Control field and the BA bitmap field in the BA Information field in the per AID TID Info subfield for TID values 0 and 3 not agreed on the BA frame transmission.

In these embodiments, if the ACK type field value of the Per AID TID Info sub-field of the M-BA frame received by the wireless communication terminal is a predetermined value, and the TID field value of the Per AID TID Info subfield is the agreed TID for the BA frame transmission, the wireless communication terminal may determine that the wireless communication terminal transmitting the M-BA frame receives all the MPDUs included in the A-MPDU. In this case, the wireless communication terminal may determine that the wireless communication terminal transmitting the M-BA frame receives all the MPDUs included in the A-MPDU, and may stop decoding the M-BA frame.

In another specific embodiment, when the wireless communication terminal receives all the MPDUs included in the A-MPDU, the TID field value of the Per User Info field may be set to a predetermined value. This will be described with reference to FIG. 12.

Figure 12:
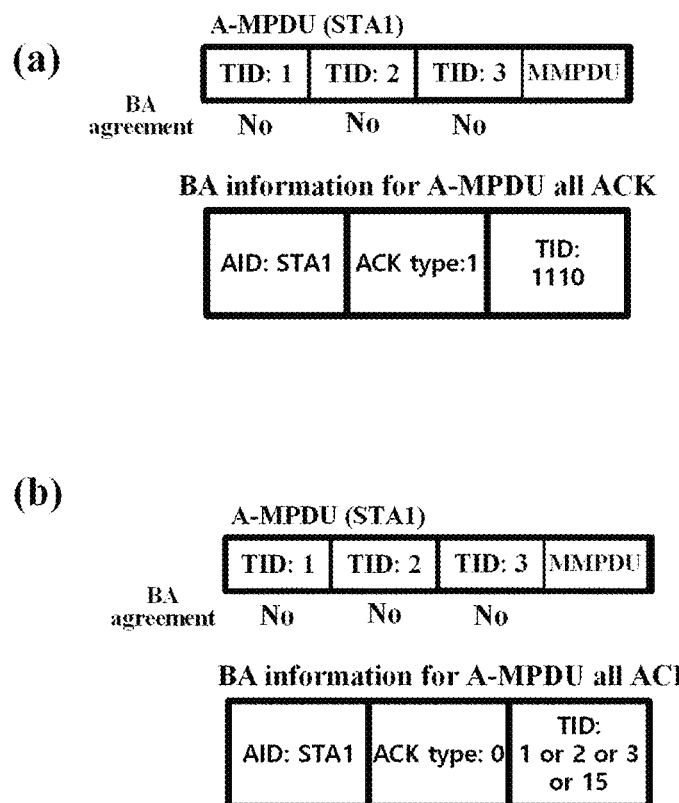
FIG. 12 shows a method of transmitting an M-BA frame by a wireless communication terminal according to another embodiment of the present invention.

FIG. 12 shows a method of transmitting an M-BA frame by a wireless communication terminal according to another embodiment of the present invention.

When the wireless communication terminal receives all the MPDUs included in the A-MPDU, the wireless communication terminal may set the TID field value of the Per AID TID Info subfield to a first value. The predetermined first value may be a value that is not used as the TID value of the MPDU when the wireless communication terminal transmits data. Specifically, the predetermined first value may be any one of $8(1000_{2b})$ to $14(1110_{2b})$. For example, the first value may be 14.

In this embodiment, the wireless communication terminal may set the ACK type field to a second value to indicate that the BA Starting Sequence Control field and the BA bitmap field are omitted in the BA Information field. The predetermined second value may be 0. In yet another specific embodiment, the predetermined second value may be 1. Specifically, when the wireless communication terminal receives all the MPDUs included in the A-MPDU transmitted by any one of the wireless communication terminals, the wireless communication terminal may set the TID field value of the Per User Info field to the first value and set the ACK type field to the second value. Accordingly, when value of the TID field of the Per AID TID Info sub-field of the M-BA frame received by the wireless communication terminal is the first value and the ACK type field value is the second value, the wireless communication terminal may determine that the wireless communication terminal transmitting the M-BA frame receives all the MPDUs included in the A-MPDU.

In another specific embodiment, the predetermined first value may be a TID value 15 ($1111_{2b}$) indicating MMPDU reception. Also, the predetermined second value may be a value that is not used in the Per AID TID Info subfield indicating whether the MMPDU is received. For example, when the ACK type field value used in the Per AID TID Info subfield indicating whether the MMPDU is received is 0, the predetermined second value may be 1.

In the embodiment of FIG. 12(a), the recipient receives the A-MDPU from the first station STA1 and decodes all the MPDUs included in the A-MPDU. In this case, the A-MPDU includes MPDU and MMPDU corresponding to TID values 1, 2, and 3, respectively. There is no agreement on the BA frame transmission for TID values 1, 2, and 3 between the originator and the recipient. Therefore, the originator sets the AID field value of the Per AID TID Info sub-field to the AID corresponding to the first station STA1, sets the ACK type field to 1, and sets the TID field to 14 to indicate that all the MPDUs included in the MPDU transmitted by the originator are received. In this case, the ACK type field value 1 indicates that the BA Starting Sequence Control field and the BA bitmap field are omitted in the BA Information field as described above. Also, the TID field value 14 is a predetermined value to indicate that all the MPDUs included in the A-MPDU are received.

In these embodiments, if the ACK type field value of the Per AID TID Info sub-field of the M-BA frame received by the wireless communication terminal is a predetermined first value, the wireless communication terminal may determine that the wireless communication terminal transmitting the M-BA frame receives all the MPDUs included in the A-MPDU. Specifically, when the ACK type field value of the Per AID TID Info sub-field of the M-BA frame received by the wireless communication terminal is a predetermined first value, and the TID field value of the Per AID TID Info sub-field is a predetermined second value, the wireless communication terminal may determine that the wireless communication terminal transmitting the M-BA frame receives all the MPDUs included in the A-MPDU. In this case, the wireless communication terminal may determine that the wireless communication terminal transmitting the M-BA frame receives all the MPDUs included in the A-MPDU, and may stop decoding the M-BA frame.

Further, when the wireless communication terminal receives the A-MPDU including only the MPDU corresponding to the TID not agreed on the BA frame transmission, the wireless communication terminal sets the ACK type field value of the Per AID TID Info subfield to a value indicating that the BA Information field includes the BA Starting Sequence Control field and the BA bitmap field, and sets the TID field of the Per AID TID Info subfield to the TID not agreed on the BA frame transmission. The wireless communication terminal does not transmit the BA Starting Sequence Control field and the BA bitmap field for the TID not agreed on the BA frame transmission. Accordingly, the wireless communication terminal sets the value of the ACK type field to a value indicating that the BA Starting Sequence Control field and the BA bitmap field are included to indicate that all the A-MPDUs are received. In this case, the A-MPDU may include an MPDU corresponding to a plurality of TIDs not agreed on the BA frame transmission. In this case, the wireless communication terminal may set a TID corresponding to the first transmitted MPDU among a plurality of MPDUs corresponding to the TID not agreed on the BA frame transmission to the TID field value of the Per AID TID Info subfield. In another specific embodiment, the wireless communication terminal may configure the TID field value of the Per AID TID Info subfield based on the User Priority (UP) of the TID. Specifically, the wireless communication terminal may set the TID having the highest UP to the TID field value of the Per AID TID Info subfield. In another specific embodiment, the wireless communication terminal may set the TID having the lowest UP value to the TID field value of the Per AID TID Info subfield. If the A-MPDU includes both an MPDU and an MMPDU corresponding to a TID not agreed on the BA frame transmission, the wireless communication terminal may set the TID field of the Per AID TID Info subfield to 15. In this case, 15(1112b) is a TID field value indicating that the MMPDU is received as described above.

In the embodiment of FIG. 12(b), the recipient receives the A-MPDU from the first station STA1 as in the embodiment of FIG. 12(a). The originator sets the AID field value of the Per AID TID Info subfield to the AID corresponding to the first station STA1, sets the ACK type field with 0, and sets the TID field to one of the TID values of the MPDU included in the A-MPDU to indicate that all the MPDUs included in the A-MPDU transmitted by the originator are received. Specifically, the value of the TID field may be 1, 2, 3, or 15 indicating the MMPDU. In this case, the ACK type field value 0 indicates that the BA Starting Sequence Control field and the BA bitmap field are not omitted in the BA Information field as described above.

When the ACK type field value of the Per AID TID Info sub-field of the M-BA frame received by the wireless communication terminal is a value indicating that the BA Information field includes the BA Starting Sequence Control field and the BA bitmap field, and the TID field of the Per AID TID Info subfield is a TID not agreed on the BA frame transmission, the wireless communication terminal may determine that the wireless communication terminal transmitting the M-BA frame receives the A-MPDU including only the MPDU corresponding to the TID not agreed on the BA frame transmission.

Figure 13:
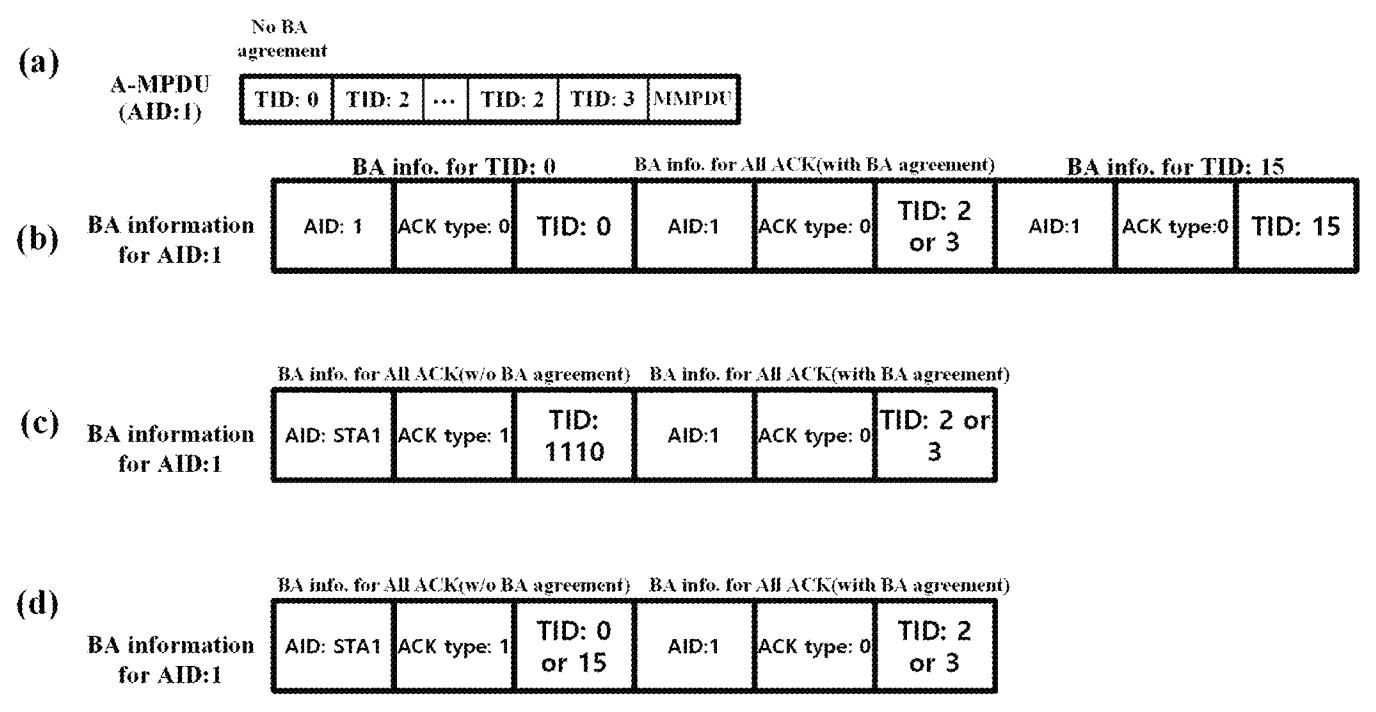

FIG. 13 shows a method of transmitting an M-BA frame by a wireless communication terminal according to another embodiment of the present invention.

The wireless communication terminal may transmit the BA frame separately signaling the MPDU corresponding to the TID agreed on the BA frame transmission and the MPDU corresponding to the TID not agreed on the BA frame transmission. The wireless communication terminal may set the TID field value of the Per AID TID Info subfield to a predetermined value to indicate whether all the MPDUs corresponding to the TID agreed on the BA frame transmission among the plurality of MPDUs included in the A-MPDU are received. Specifically, when the wireless communication terminal receives all the MPDUs corresponding to the TID agreed on the BA frame transmission among the plurality of MPDUs included in the A-MPDU, the wireless communication terminal may set the TID field value of the Per AID TID Info subfield to one of the TIDs agreed on the BA frame transmission regardless of whether the wireless communication terminal receives an MPDU corresponding to a TID not agreed on the BA frame transmission among a plurality of MPDUs included in the A-MPDU. In another specific embodiment, when the wireless communication terminal receives all the MPDUs corresponding to the TID agreed on the BA frame transmission among the plurality of MPDUs included in the A-MPDU, the wireless communication terminal may set the TID field value of the Per AID TID Info subfield to a predetermined value regardless of whether the wireless communication terminal receives an MPDU corresponding to a TID not agreed on the BA frame transmission among a plurality of MPDUs included in the A-MPDU. The predetermined value may be a value that is not used as the TID value of the MPDU when the wireless communication terminal transmits data. Specifically, the predetermined value may be any one of $8(1000_{2b})$ to $14(1110_{2b})$. For example, the predetermined value may be 14. Also, when the wireless communication terminal receives an MPDU corresponding to a TID not agreed on the BA frame transmission, the wireless communication terminal may indicate that the wireless communication terminal receives an MPDU corresponding to a TID not agreed on the BA frame transmission using a Per AID TID Info subfield other than the Per AID TID Info subfield indicating that all the MPDUs corresponding to the TID agreed on the BA frame transmission are received. Specifically, when the wireless communication terminal receives all the MPDUs corresponding to the TID agreed on the BA frame transmission among the plurality of MPDUs included in the A-MPDU, the wireless communication terminal may indicate that all the MPDUs corresponding to the TID not agreed on the BA frame transmission among the MPDUs are received through a separate Per AID TID Info subfield.

In the embodiment of FIG. 13, the recipient receives the A-MPDU from the originator having the AID value of 1 and decodes both the MPDU and the MMPDU included in the A-MPDU. At this time, the A-MPDU includes MPDU and MMPDU having TID values of 0, 2, and 3 as in the embodiment of FIG. 13(a). In addition, the originator and the recipient agreed on a BA frame transmission for TID values 2 and 3 and do not agree on a BA frame transmission for TID value 0. As described above, the recipient sets the TID field value and the ACK type field value of the Per AID TID Info subfield to indicate that all the MPDUs corresponding to the TID agreed on the BA frame transmission among the MPDUs included in the A-MPDU are received. At this time, the recipient may indicate whether the MPDU corresponding to the TID not agreed on the BA frame transmission is indicated using a separate Per AID TID Info subfield. Specifically, in the embodiment of FIG. 13(b), the recipient sets the ACK type field of the first Per AID TID Info subfield to 0, and sets the TID field to 0 to indicate that the MPDU corresponding to the TID 0 is received. Also, the recipient sets the ACK type field of the second Per AID TID Info subfield to 0 and sets the TID field to 2 or 3 to indicate that all the MPDUs corresponding to the TID agreed on the BA frame transmission among the MPDUs included in the A-MPDU are received. In addition, the recipient sets the ACK type field of the third Per AID TID Info subfield to 0 and sets the TID field to 15 to indicate that all the MMPDUs included in the A-MPDU are received.

In addition, as described above, the recipient may indicate that all the MPDUs corresponding to the TID agreed on the BA frame transmission among the MPDUs included in the A-MPDU are received using a separate Per AID TID Info field. At this time, the recipient may set the TID field of the separate Per AID TID Info field to a predetermined value. In the embodiment of FIG. 13(c), the recipient sets the ACK type field of the first Per AID TID Info subfield to 0 and sets the TID field to $14(1110_{2b})$ to indicate that all the MPDUs corresponding to the TID not agreed on the BA frame transmission among the MPDUs included in the A-MPDU are received. Also, the recipient sets the ACK type field of the second Per AID TID Info subfield to 0 and sets the TID field to 2 or 3 to indicate that all the MPDUs corresponding to the TID agreed on the BA frame transmission among the MPDUs included in the A-MPDU are received. In yet another specific embodiment, the recipient may set the TID field of the separate Per AID TID Info field to one of the TIDs not agreed on the BA frame transmission. In the embodiment of FIG. 13(d), the recipient sets the ACK type field of the first Per AID TID Info subfield to 0 and sets the TID field to 0 or 15 to indicate that all the MPDUs corresponding to the TID not agreed on the BA frame transmission among the MPDUs included in the A-MPDU are received.

Figure 14:
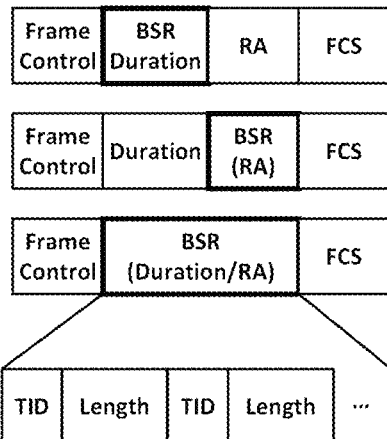
FIG. 14 shows an operation in which a wireless communication terminal transmits a BSR according to an embodiment of the present invention.
Figure 14:
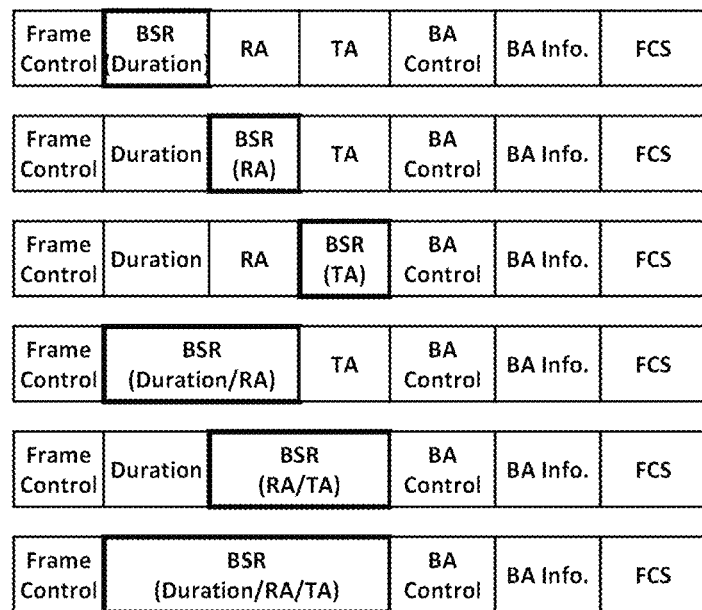

FIG. 14 shows an operation in which a wireless communication terminal transmits a BSR according to an embodiment of the present invention.

When the wireless communication terminal transmits the trigger-based PPDU, the wireless communication terminal may transmit the BSR through the Duration field of the MAC header. In addition, when the wireless communication terminal transmits an ACK frame using the trigger-based PPDU, the wireless communication terminal may transmit the BSR through at least one of the Receiver Address (RA) field and the Transmitter Address (TA) field of the MAC header. Accordingly, the wireless communication terminal receiving the trigger-based PPDU may obtain the BSR from the Duration field of the MAC header. In addition, the wireless communication terminal receiving the trigger-based PPDU may obtain the BSR from at least one of the Receiver Address (RA) field and the Transmitter Address (TA) field of the MAC header.

Specifically, the AP may trigger the ACK transmission by transmitting UL trigger information using the trigger frame or the MAC header in the DL transmission. In this case, the AP may trigger the ACK frame transmission and the BSR transmit together using the indicator of the trigger frame or the indicator of the UL trigger information. In this case, the AP may recognize from which wireless communication terminal the UL transmission is performed through which Resource Unit (RU). Also, the AP may recognize the duration of the UL transmission. Therefore, the AP may decode the MPDU without the information indicated by the RA field, the TA field, and the Duration field of the MAC header included in the UL PPDU. As a result, as described above, when a wireless communication terminal transmits an ACK frame using a trigger-based PPDU, the wireless communication terminal may transmit the BSR using the Duration field of the ACK frame. In addition, when the wireless communication terminal transmits an ACK frame using the trigger-based PPDU, the wireless communication terminal may transmit the BSR through at least one of the RA field and the TA field of the ACK frame. At this point, the ACK frame may be a BA frame. Specifically, the ACK frame may be an M-BA frame. The format of the specific ACK frame may be the same as that shown in FIG. 14(a). In addition, the format of the concrete BA frame and the M-BA frame may be the same as that shown in FIG. 14(b).

FIG. 15 shows an operation in which a wireless communication terminal transmits a BSR according to another embodiment of the present invention.

The wireless communication terminal may transmit the BSR using the QoS Control field of the ACK frame. In another specific embodiment, the wireless communication terminal may transmit the BSR using the HE-A control field. The wireless communication terminal receiving the ACK frame may obtain the BSR from the QoS Control field. In addition, the wireless communication terminal receiving the ACK frame may obtain the BSR from the HE-A control field.

As described with reference to FIG. 14, the AP may trigger the ACK frame transmission and the BSR transmission of the wireless communication terminal together. In this case, the wireless communication terminal may transmit the ACK frame by inserting the BSR into the QoS Control field of the ACK frame. Also, the wireless communication terminal may transmit an ACK frame by inserting the BSR into the HE-A Control field of the ACK frame. At this point, the ACK frame may be a BA frame. Specifically, the ACK frame may be an M-BA frame. The format of the specific ACK frame may be the same as that shown in FIG. 15(a). In addition, the format of the concrete BA frame and the M-BA frame may be the same as that shown in FIG. 15(b).

Figure 16:
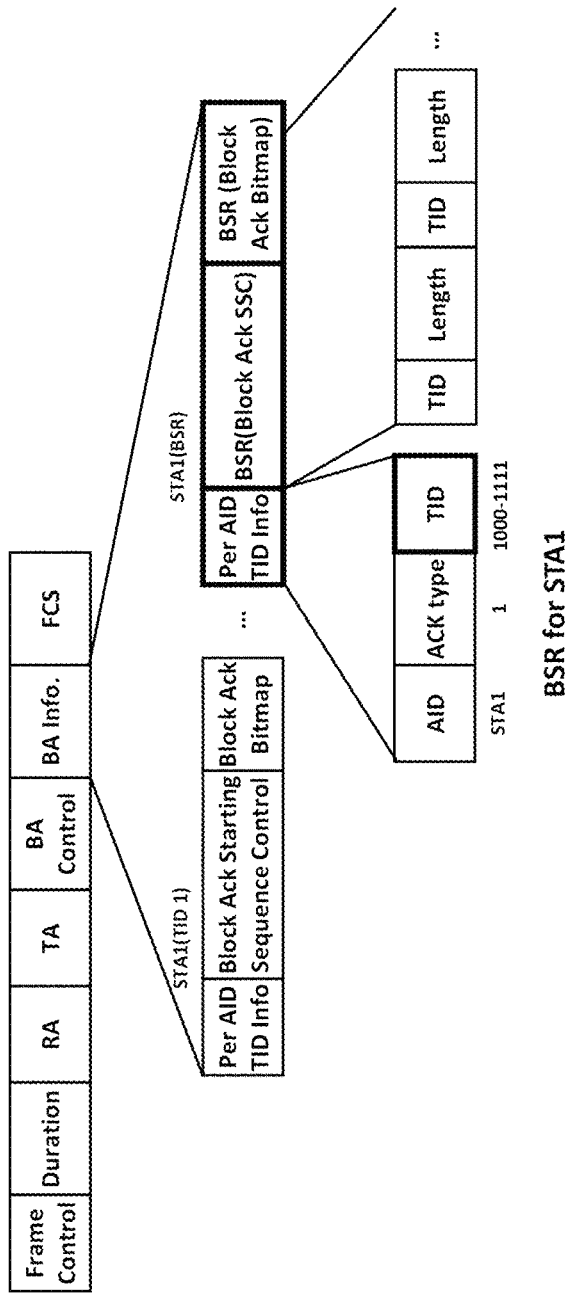
FIG. 16 shows an operation in which a wireless communication terminal transmits a BSR according to another embodiment of the present invention.

FIG. 16 shows an operation in which a wireless communication terminal transmits a BSR according to another embodiment of the present invention.

The wireless communication terminal may transmit the BSR using the BA Info field of the M-BA frame. Specifically, the wireless communication terminal may insert a BA Info field for BSR transmission into an M-BA frame. In a specific embodiment, the wireless communication terminal may insert a BA Info field for BSR transmission after the BA Info field corresponding to the TID receiving the data in the M-BA frame. Also, the wireless communication terminal may set the TID field of the BA Info field to a predetermined value to indicate that the corresponding BA Info field is for BSR transmission. In this case, the predetermined value may be a TID value which is not used for data transmission. Specifically, the predetermined value may be any one of $8(1000_{2b})$ to $15(1111_{2b})$. Also, the wireless communication terminal may transmit the BSR using the BA Ack sequence control and the BA bitamp subfield in the BA Info field. In this case, the wireless communication terminal may set the ACK type field to a value indicating that a Block Ack sequence control and a BA bitamp subfield present. The format of the specific M-BA frame may be the same as that shown in FIG. 16.

The wireless communication terminal receiving the M-BA frame may obtain the BSR from the BA Info field. The wireless communication terminal receiving the M-BA frame may obtain the BSR from the last BA Info field.

Figure 17:
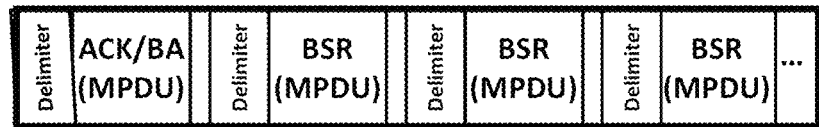
FIG. 17 shows an operation in which a wireless communication terminal transmits a BSR according to another embodiment of the present invention.

FIG. 17 shows an operation in which a wireless communication terminal transmits a BSR according to an embodiment of the present invention.

The wireless communication terminal may transmit the QoS Null MPDU including the ACK frame and the BSR using the A-MPDU. Specifically, when the size of the RU allocated to the wireless communication terminal is larger than a certain reference, the wireless communication terminal may transmit the QoS Null MPDU including the ACK frame and the BSR using the A-MPDU. In another specific embodiment, if the size of the information to be transmitted by the BSR is greater than a certain reference, the wireless communication terminal may transmit the QoS Null MPDU including the ACK frame and the BSR using the A-MPDU. In addition, the wireless communication terminal may transmit an ACK frame and a plurality of QoS null MPDUs using the A-MPDU. The wireless communication terminal receiving the A-MPDU including the ACK frame may obtain the QoS Null MPDU including the BSR from the A-MPDU.

Also, the ACK frame transmitted by the wireless communication terminal may be an M-BA frame. The specific format of the A-MPDU transmitted by the wireless communication terminal may be the same as that shown in FIG. 17.

Figure 18:
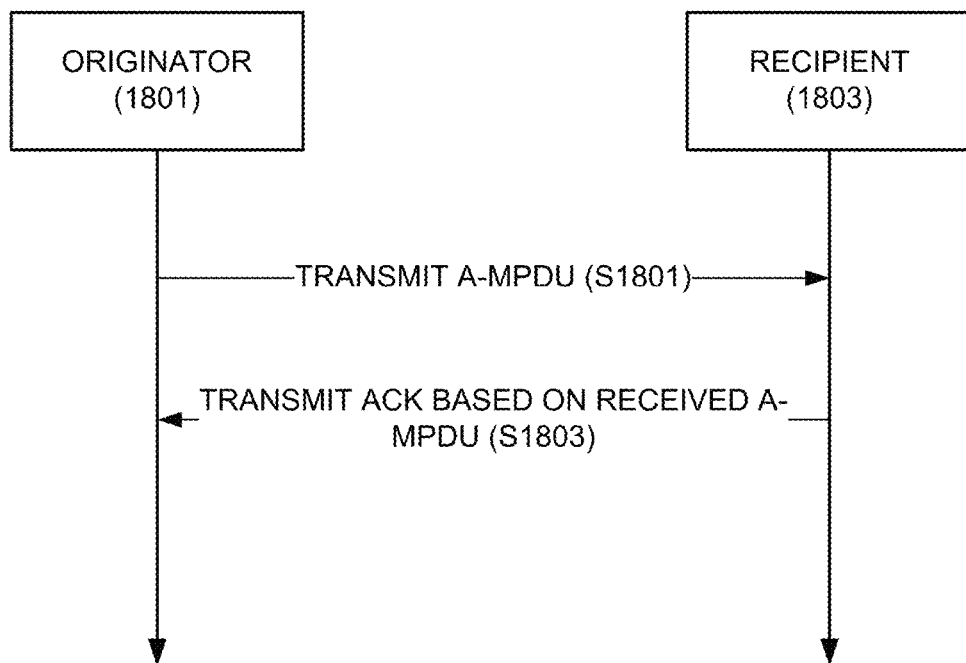
FIG. 18 shows the operation of a wireless communication terminal according to an embodiment of the present invention.

FIG. 18 shows the operation of a wireless communication terminal according to an embodiment of the present invention.

The originator 1801 transmits the A-MPDU to the recipient 1803 (S1801). In this case, the A-MPDU may include a plurality of MPDUs corresponding to a plurality of different TIDs. Specifically, the A-MPDU may be the Multi-TID A-MPDU described above. In addition, a plurality of originators 1801 may simultaneously transmit the A-MPDU to the recipient 1803.

The recipient 1803 transmits an ACK to the originator 1801 based on the received A-MPDU (S1803). When the recipient 1803 receives all the MPDUs included in the A-MPDU, the recipient 1803 may transmit a BA frame signaling that all MPDUs included in the A-MPDU are received without a bitmap indicating whether each MPDU included in the A-MPDU is received. Specifically, the recipient 1803 may transmit a BA frame by inserting a Per AID TID Info field indicating that all the MPDUs included in the A-MPDU received from the originator 1801 are received into the BA frame. Also, the recipient 1803 may set a predetermined first value in the traffic identifier (TID) field of the BA frame when transmitting the BA frame. In this case, the TID field is for indicating the TID of the MPDU, in which whether the MPDU is received is indicated by the BA frame. The predetermined first value may be a value that is not used as a TID value when transmitting data. Specifically, the predetermined first value may be any one of $8(1000_{2b})$ to $14(1110_{2b})$. For example, the predetermined first value may be 14. In another specific embodiment, the predetermined first value may be a TID value 15 ($1111_2$b) indicating MMPDU reception.

When the recipient 1803 transmits a BA frame signaling that all MPDUs included in the A-MPDU are received, the recipient 1803 may omit the start sequence control field. The start sequence control field is for indicating a MPDU, in which whether the MPDU is received is indicated by the bitmap. In this case, the start sequence control field may be the Block ACK Starting Sequence Control field described above. Specifically, when the recipient 1803 transmits a BA frame signaling that all the MPDUs included in the A-MPDU are received, the recipient 1803 may indicate that the BA frame does not include a bitmap and a start sequence control field by setting the value of the ACK type field indicating the type of ACK to a predetermined second value.

Also, when the value of the TID field of the BA frame received by the originator 1801 is a predetermined first value, the originator 1801 may determine that the BA frame indicates that the recipient 1803 receives all the MPDUs included in the A-MPDU without a bitmap indicating whether each MPDU included in the A-MPDU is received. In this case, the TID field is for indicating the TID of the MPDU, in which whether the MPDU is received is indicated by the BA frame. Specifically, when the value of the TID field of the BA frame received by the originator 1801 is a predetermined first value and the value of the ACK type field of the BA frame is a predetermined second value, the originator 1801 may determine that the BA frame indicates that the recipient 1803 receives all the MPDUs included in the A-MPDU without a bitmap indicating whether each MPDU included in the A-MPDU is received. In addition, when the value of the TID field of the BA frame received by the originator 1801 is a predetermined first value, the originator 1801 may stop decoding the corresponding BA frame.

In another specific embodiment, when the recipient 1803 transmits a BA frame signaling that all A-MPDUs are received, the ACK type field indicating the type of ACK in the BA frame may be set to a predetermined value, and the TID value agreed on the BA frame transmission between originator 1801 and recipient 1803 may be set to the TID field of the BA frame. When a TID agreed on for BA frame transmission between originator 1801 and recipient 1803 is provided in plurality, the recipient 1803 may set the TID corresponding to the last transmitted MPDU among the plurality of MPDUs corresponding to the agreed TID for the BA frame transmission to the TID field value of the Per AID TID Info subfield. In another specific embodiment, when a TID agreed on the BA frame transmission is provided in plurality, the recipient 1803 may set the TID field value of the Per AID TID Info subfield based on the user priority (UP) of the TID. Specifically, the recipient 1803 may set the TID having the highest UP to the TID field value of the Per AID TID Info subfield. In another specific embodiment, the recipient 1803 may set the TID having the lowest UP value to the TID field value of the Per AID TID Info subfield.

Also, when the value of the ACK type field of the BA frame is a predetermined value, and the value of the TID field is the TID agreed on the BA frame transmission between the originator 1801 and the recipient 1803, the originator 1801 may determine that the BA frame indicates that the recipient 1803 receives all the MPDUs included in the A-MPDU without a bitmap indicating whether each MPDU included in the A-MPDU is received.

The recipient 1803 may transmit the BA frame separately signaling the MPDU corresponding to the TID agreed on the BA frame transmission and the MPDU corresponding to the TID not agreed on the BA frame transmission. The recipient 1803 may set the TID field value of the Per AID TID Info subfield to a predetermined value to indicate whether all the MPDUs corresponding to the TID agreed on the BA frame transmission among the plurality of MPDUs included in the A-MPDU are received. Specifically, when the recipient 1803 receives all the MPDUs corresponding to the TID agreed on the BA frame transmission among the plurality of MPDUs included in the A-MPDU, the recipient 1803 may set the TID field value of the Per AID TID Info subfield to one of the TIDs agreed on the BA frame transmission regardless of whether the recipient 1803 receives an MPDU corresponding to a TID not agreed on the BA frame transmission among a plurality of MPDUs included in the A-MPDU. In another specific embodiment, when the recipient 1803 receives all the MPDUs corresponding to the TID agreed on the BA frame transmission among the plurality of MPDUs included in the A-MPDU, the recipient 1803 may set the TID field value of the Per AID TID Info subfield to a predetermined value regardless of whether the recipient 1803 receives an MPDU corresponding to a TID not agreed on the BA frame transmission among a plurality of MPDUs included in the A-MPDU. The predetermined value may be a value that is not used as the TID value of the MPDU when the wireless communication terminal transmits data. Specifically, the predetermined value may be any one of $8(1000_{2b})$ to $14(1110_{2b})$. For example, the predetermined value may be 14. Also, when the recipient 1803 receives an MPDU corresponding to a TID not agreed on the BA frame transmission, the recipient 1803 may indicate that the recipient 1803 receives an MPDU corresponding to a TID not agreed on the BA frame transmission using a Per AID TID Info subfield other than the Per AID TID Info subfield indicating that all the MPDUs corresponding to the TID agreed on the BA frame transmission are received. Specifically, when the recipient 1803 receives all the MPDUs corresponding to the TID agreed on the BA frame transmission among the plurality of MPDUs included in the A-MPDU, the recipient 1803 may indicate that all the MPDUs corresponding to the TID not agreed on the BA frame transmission among the MPDUs are received through a separate Per AID TID Info subfield.

In addition, when the TID field value of the Per AID TID Info subfield of the BA frame received by the originator 1801 is a predetermined value, the originator 1801 may determine that the recipient 1803 receives all the MPDUs corresponding to the TID agreed on the BA frame transmission among the plurality of MPDUs included in the A-MPDU.

In addition, the recipient 1803 may set the ID Info subfield to a predetermined value to indicate that all the data transmitted by the plurality of originators 1801 is received. The predetermined value may be 15 ($1111_{2b}$). In this case, the recipient 1803 may insert one per AID TID Info subfield in the BA Info field. When the recipient 1803 receives all the MPDUs transmitted by the plurality of originators 1803, the recipient 1803 may set the AID field of the per AID TID Info subfield to an AID indicating a plurality of wireless communication terminals transmitting data. Also, the recipient 1803 may insert one per AID TID Info subfield and set the AID field of the per AID TID Info subfield to an AID indicating the entire wireless communication terminal. In this case, the entire wireless communication terminal may indicate all the wireless communication terminals included in the same BSS as the recipient 1803. Also, the recipient 1803 may set the ACK type of the AID TID Info sub-field to a predetermined value to indicate that the bitmap is omitted. Specifically, the recipient 1803 may set the ACK type field of the AID TID Info sub field to a predetermined value to indicate that the BA Starting Sequence Control field and the BA bitmap field are omitted in the BA Information field. In this case, the predetermined value may be 0. In yet another specific embodiment, the recipient 1803 may omit the per AID TID Info subfield.

The specific operation of the recipient 1803 related to the BA frame transmission may be the same as that of the embodiments described with reference to FIGS. 9 to 13. In addition, the specific operation of the originator 1801 related to the reception of the BA frame may be the same as that of the embodiments described with reference to FIGS. 9 to 13.

In addition, the recipient 1803 may transmit the BSR together when transmitting the ACK frame. In this case, the ACK frame may include a BA frame, and the ACK frame may be an M-BA frame. Specifically, when the recipient 1803 transmits the trigger-based PPDU, the recipient 1803 may transmit the BSR using the Duration field of the MAC header. In addition, when the recipient 1803 transmits an ACK frame using the trigger-based PPDU, the recipient 1803 may transmit the BSR using at least one of the Receiver Address (RA) field and the Transmitter Address (TA) field of the MAC header. In another specific embodiment, the recipient 1803 may transmit the BSR using the QoS Control field of the ACK frame. In another specific embodiment, the recipient 1803 may transmit the BSR using the HE-A control field. In another specific embodiment, the recipient 1803 may transmit the BSR using the BA Info field of the M-BA frame. In another specific embodiment, the recipient 1803 may transmit a QoS Null MPDU including an ACK frame and a BSR using an A-MPDU. The specific operation of the recipient 1803 and originator 1801 may be the same as that of the embodiments described with reference to FIGS. 14 to 17.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that is a recipient for receiving data, the wireless communication terminal comprising:
a transceiver; and
a processor,
wherein the processor is configured to:
receive an All ACK capable indicator from an originator using the transceiver, wherein the All ACK capable indicator indicates that the originator supports for processing an All ACK, wherein the All ACK indicates that the wireless communication terminal signals that all the MPDUs included in an Aggregate-MAC Protocol Data Unit (A-MPDU) transmitted from the originator are received,
receive the A-MPDU from the originator using the transceiver, wherein the A-MPDU includes a plurality of MPDUs, each of which corresponds to a respective one of a plurality of a traffic identifier (TID)s,
when generating a block ACK (BA) frame, set a TID field of the BA frame, usable for indicating a TID of a MPDU to be acknowledged in the BA frame, to a predetermined first value and a value of an ACK type field of the BA frame to a predetermined second value, omit a bitmap indicating whether each MPDU included in the A-MPDU is received in the BA frame, and omit a Block ACK Starting Sequence Control field in the BA frame, wherein the predetermined first value is predetermined for indicating that all MPDUs in the A-MPDU are received, is a value that cannot be used as a value of TID of traffic of data transmission, and is limited to one of 8 to 14 and not 15 which indicates management MPDU (MMPDU), wherein the predetermined second value of the ACK type filed signals that the bitmap and Block ACK Starting Sequence Control field are omitted, and
transmit to the originator the BA frame using the transceiver.

2. A wireless communication terminal that is an originator for transmitting data, the wireless communication terminal comprising:
a transceiver; and
a processor,
wherein the processor is configured to:
transmit an All ACK capable indicator to a recipient using the transceiver, wherein the All ACK capable indicator indicates that the originator supports for processing an All ACK, wherein the All ACK indicates that the recipient signals that all the MPDUs included in an Aggregate-MAC Protocol Data Unit (A-MPDU) transmitted from the originator are received,
transmit the A-MPDU to the recipient using the transceiver, wherein the A-MPDU includes a plurality of MPDUs, each of which corresponds to a respective one of a plurality of a traffic identifier (TID)s,
receive a block ACK (BA) frame from the recipient using the transceiver, wherein the BA frame includes a TID field usable for indicating a TID of a MPDU to be acknowledged in the BA frame, and
when a value of the TID field of the BA frame is a predetermined first value and a value of an ACK type field of the BA frame is a predetermined second value, determine that the BA frame indicates that all MPDUs included in the A-MPDU are received and does not include a bitmap indicating whether each MPDU included in the A-MPDU is received,
wherein the predetermined first value is predetermined for indicating that all MPDUs in the A-MPDU are received, is a value that cannot be used as a value of TID of traffic of data transmission, and is limited to one of 8 to 14 and not 15 which indicates management MPDU (MMPDU).

3. The wireless communication terminal of claim 2, wherein the processor is configured to determine that the BA frame does not include a Block ACK Starting Sequence Control field when the value of the TID field of the BA frame is the predetermined first value and the value of the ACK type field of the BA frame is the predetermined second value.

4. A method of operating a wireless communication terminal that is an originator for transmitting data, the method comprising:
transmitting an All ACK capable indicator to a recipient, wherein the All ACK capable indicator indicates that the originator supports for processing an All ACK, wherein the All ACK indicates that the recipient signals that all the MPDUs included in an Aggregate-MAC Protocol Data Unit (A-MPDU) transmitted from the originator are received,
transmitting the A-MPDU to the recipient, wherein the A-MPDU includes a plurality of MPDUs, each of which corresponds to a respective one of a plurality of a traffic identifier (TID)s, receiving a block ACK (BA) frame from the recipient, wherein the BA frame includes a TID field usable for indicating a TID of a MPDU to be acknowledged in the BA frame, and in response that a value of the TID field of the BA frame is a predetermined first value and a value of an ACK type field of the BA frame is a predetermined second value, determining that the BA frame indicates that all MPDUs included in the A-MPDU are received and does not include a bitmap indicating whether each MPDU included in the A-MPDU is received, wherein the predetermined first value is predetermined for indicating that all MPDUs in the A-MPDU are received, is a value that cannot be used as a value of TID of traffic of data transmission, and is limited to one of 8 to 14 and not 15 which indicates management MPDU (MMPDU).

5. The method of claim 4, further comprising determining that the BA frame does not include a Block ACK Starting Sequence Control field in response that when the value of the TID field of the BA frame is the predetermined first value and the value of the ACK type field of the BA frame is the predetermined second value.

* * * * *